United States Patent
Hoshika et al.

(10) Patent No.: US 10,251,526 B2
(45) Date of Patent: Apr. 9, 2019

(54) METHOD AND APPARATUS FOR FORMING COMPRESSION-BONDING PORTION TO CONTINUOUS BODY OF WEB MEMBER WITH FIBER BUNDLE

(71) Applicant: UNICHARM Corporation, Ehime (JP)

(72) Inventors: Kazuhiko Hoshika, Kagawa (JP);
Yoshihide Ishikawa, Kagawa (JP);
Hisaoki Nobukuni, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 15/529,487

(22) PCT Filed: Nov. 28, 2014

(86) PCT No.: PCT/JP2014/081625
§ 371 (c)(1),
(2) Date: May 24, 2017

(87) PCT Pub. No.: WO2016/084251
PCT Pub. Date: Jun. 2, 2016

(65) Prior Publication Data
US 2017/0258289 A1  Sep. 14, 2017

(51) Int. Cl.
*A47L 13/38* (2006.01)
*A47L 13/42* (2006.01)
(Continued)

(52) U.S. Cl.
CPC .............. *A47L 13/38* (2013.01); *A47L 13/16* (2013.01); *A47L 13/20* (2013.01); *A47L 13/46* (2013.01);
(Continued)

(58) Field of Classification Search
CPC .......... A47L 13/10; A47L 13/16; A47L 13/38; A47L 13/42; A47L 13/46; B29C 65/18;
(Continued)

(56) References Cited

U.S. PATENT DOCUMENTS 4,333,979 A   6/1982  Sciaraffa et al.
4,493,868 A   1/1985  Meitner
(Continued)

FOREIGN PATENT DOCUMENTS

EP   2431513 A1    3/2012
JP   S62-125061 A  6/1987
(Continued)

OTHER PUBLICATIONS

Written Opinion of the ISA in PCT/JP2014/081625, dated Feb. 17, 2015.
(Continued)

*Primary Examiner* — Michael A Tolin
(74) *Attorney, Agent, or Firm* — Hauptman Ham, LLP

(57) ABSTRACT

A method for forming compression-bonding portions in a continuous body including a fiber bundle while conveying the continuous body includes: rotating a rotator, while holding the continuous body on an outer peripheral surface of the rotator, to convey the continuous body; compressing a target part of each of the compression-bonding portions in the continuous body using a compression-bonding member and the rotator to form the compression-bonding portions; and pressing the continuous body inwardly in a radial direction of the rotator using a pressing member, while avoiding forming the compression-bonding portions in the continuous body, the pressing member being opposed to the outer peripheral surface of the rotator, at a position upstream in the direction of rotation from the compression-bonding member.

3 Claims, 11 Drawing Sheets

(51) Int. Cl.
| | |
|---|---|
| *A47L 13/46* | (2006.01) |
| *B32B 5/02* | (2006.01) |
| *B32B 5/26* | (2006.01) |
| *A47L 13/16* | (2006.01) |
| *A47L 13/20* | (2006.01) |
| *B32B 37/10* | (2006.01) |
| *B29C 65/00* | (2006.01) |
| *B32B 37/00* | (2006.01) |
| *D04H 3/005* | (2012.01) |
| *D04H 3/14* | (2012.01) |
| *D06C 15/02* | (2006.01) |
| *D06C 23/04* | (2006.01) |
| *D04H 3/08* | (2006.01) |

(52) U.S. Cl.
CPC .. *B29C 66/81463* (2013.01); *B29C 66/83413* (2013.01); *B32B 5/022* (2013.01); *B32B 5/26* (2013.01); *B32B 37/0076* (2013.01); *B32B 37/10* (2013.01); *D04H 3/005* (2013.01); *D04H 3/14* (2013.01); *D06C 15/02* (2013.01); *D06C 23/04* (2013.01); *A47L 13/42* (2013.01); *B32B 5/02* (2013.01); *B32B 2250/20* (2013.01); *B32B 2432/00* (2013.01); *D04H 3/08* (2013.01)

(58) Field of Classification Search
CPC .............. B29C 65/20; B29C 66/81463; B29C 66/81465; B29C 66/83411; B29C 66/83413; B32B 5/02; B32B 5/022; B32B 5/26; B32B 37/0076; B32B 37/0084; B32B 37/02; B32B 2250/20; B32B 2432/00; D04H 3/005; D04H 3/08; D04H 3/14
See application file for complete search history.

(56) References Cited

U.S. PATENT DOCUMENTS

| | | | |
|---|---|---|---|
| 4,713,132 A * | 12/1987 | Abel | .................... B29C 65/087 156/290 |
| 5,057,357 A | 10/1991 | Winebarger | |
| 6,143,393 A | 11/2000 | Abe et al. | |
| 8,151,402 B2 * | 4/2012 | Takabayashi | ........... A47L 13/20 15/209.1 |
| 2002/0148061 A1 | 10/2002 | Tanaka et al. | |
| 2006/0068167 A1 | 3/2006 | Keck et al. | |
| 2007/0251643 A1 | 11/2007 | Umebayashi et al. | |
| 2011/0123773 A1 | 5/2011 | Lofink et al. | |
| 2011/0277258 A1 | 11/2011 | Otsuka et al. | |

FOREIGN PATENT DOCUMENTS

| | | |
|---|---|---|
| JP | 11-235301 A | 8/1999 |
| JP | 2004-195709 A | 7/2004 |
| JP | 2005-40641 A | 2/2005 |
| JP | 4592690 B2 | 12/2010 |
| JP | 2011-16021 A | 1/2011 |
| JP | 2013-99429 A | 5/2013 |
| JP | 2013-117074 A | 6/2013 |
| JP | 2013-147784 A | 8/2013 |
| JP | 2014-129634 A | 7/2014 |

OTHER PUBLICATIONS

Office Action of the CA Application No. 2968428, dated Jun. 14, 2017.
International Search Report in PCT Application No. PCT/JP2014/081625, dated Feb. 17, 2015.
Extended European Search Report in EP Application No. 14907155.7, dated Jan. 29, 2018, 9pp.
Extended European Search Report in EP Application No. 14906959.3, dated Jan. 29, 2018, 11pp.
Office Action in U.S. Appl. No. 15/529,486, dated Jan. 25, 2018, 22pp.
International Search Report in PCT Application No. PCT/JP2014/081623, dated Feb. 17, 2015, 4pp.
Office Action in CA Application No. 2966472, dated May 24, 2017, 4pp.
International Preliminary Report on Patentability in PCT/JP2014/081623, dated Jun. 8, 2017, 16pp.

* cited by examiner

METHOD AND APPARATUS FOR FORMING COMPRESSION-BONDING PORTION TO CONTINUOUS BODY OF WEB MEMBER WITH FIBER BUNDLE

RELATED APPLICATIONS

The present application is a national phase of International Application Number PCT/JP2014/081625, filed Nov. 28, 2014.

TECHNICAL FIELD

The present invention relates to a method and an apparatus for forming a compression-bonding portion in a continuous body of a web member with a fiber bundle such as a tow, which is used to manufacture a cleaning web member.

BACKGROUND ART

Conventionally, there is known a cleaning web member that includes a fiber bundle such as a tow used for cleaning (Patent Literature 1). To integrally bundle and fix fibers constituting the fiber bundle, a welding portion serving as a compression-bonding portion is formed in the web member.

CITATION LIST

Patent Literature

[PTL 1] 2005-40641

SUMMARY OF INVENTION

Technical Problem

FIG. 1 is a schematic side view of a heat sealing apparatus 10' used to form such aforementioned welding portions jm' in a production line of the web member. Fiber bundles of a web member when being sent to this apparatus 10' are in a state of being continuous in a predetermined direction, while the fiber direction is set along the predetermined direction. Therefore, as illustrated in FIG. 1, the web member is also in a state of being a continuous body 1a' that is continuous in the predetermined direction. In this apparatus 10', while the continuous body 1a' of the web member is conveyed in the predetermined direction set as a direction of conveyance, the welding portions jm' are formed at intervals each corresponding to a product pitch in the direction of conveyance.

Here, the welding portions jm' are formed, for example, in two stages. That is, for example, a first seal roll 41R' and a second seal roll 42R' are disposed as compression-bonding members at two positions in a direction of rotation Dc21' of a rotating drum 21', which serves as an example of a rotator configured to convey the continuous body 1a' of the web member while holding it on an outer peripheral surface 21a'. When a formation target part jmp' of the welding portion jm' in the continuous body 1a' of the web member passes through a position of the first seal roll 41R', the first seal roll 41R' compresses the formation target part jmp' in cooperation with a supporting portion 21s' on the outer peripheral surface 21a' of the rotating drum 21', to form a welding portion jm1' of a first stage. Thereafter, this welding portion jm1' of the first stage passes through a position of the second seal roll 42R', which is positioned downstream in the direction of rotation Dc21'. At this time, the second seal roll 42R' further compresses the compression-bonding portion jm1' of the first stage in cooperation with the supporting portion 21s' on the outer peripheral surface 21a' of the rotating drum 21', to form a welding portion jm2' of a second stage. Consequently, the welding portion jm' is formed in the continuous body 1a' of the web member in two stages. Incidentally, in this apparatus 10', the welding portion jm' is linearly formed along the CD direction (corresponding to a direction of penetrating a paper in FIG. 1).

As illustrated in a schematic perspective view of FIG. 2, the fiber bundle 5a immediately after being brought in a production line is of a rope-like form having a substantially circular shape in cross section. Thus, this fiber bundle 5a is opened in an opening process on the production line, to be opened in the CD direction as illustrated in FIG. 2. Then, the fiber bundle 5a in such an opened state is brought into the aforementioned heat sealing apparatus 10'.

However, even in this state opened in the CD direction, fiber distribution that is uneven in the CD direction may commonly exist. In some cases, great unevenness thereof may exist.

Here, formation of the welding portion jm', which is linear along the CD direction, in a state where great unevenness in fiber distribution remains, causes great unevenness in the degree of welding. This may cause falling off of fibers in a portion having a lower degree of welding, while causing broken weld (break caused in association with welding) in a portion having a high degree of welding. This may cause deterioration of product yield in the cleaning web members.

The present disclosure is made in view of conventional problems described above, and an aspect of the present disclosure is to form a compression-bonding portion such as welding portion in a continuous body of a web member in a state where unevenness is reduced in fiber distribution in a CD direction of a fiber bundle.

Solution to Problem

An aspect of the present disclosure to achieve an aspect described above is a method for forming compression-bonding portions in a continuous body of a web member including a fiber bundle, while conveying the continuous body in a predetermined direction set as a direction of conveyance, the fiber bundle being continuous in the predetermined direction while a fiber direction is set along the predetermined direction, the compression-bonding portions being formed at intervals in the direction of conveyance, the method comprising: rotating a rotator around a rotation axis along a CD direction intersecting with the direction of conveyance, while holding the continuous body of the web member on an outer peripheral surface of the rotator, to convey the continuous body of the web member in a direction of rotation of the rotator set as the direction of conveyance; compressing a formation target part of each of the compression-bonding portions in the continuous body of the web member, using a compression-bonding member and the rotator, when the formation target part passes through a position of the compression-bonding member disposed at a predetermined position in the direction of rotation, to form the compression-bonding portions; and pressing the continuous body of the web member to an inside in a radial direction of rotation of the rotator using a pressing member, while avoiding forming the compression-bonding portions in the continuous body of the web member, the pressing member being disposed to be opposed to the outer peripheral surface of the rotator, at a position upstream in the direction of rotation with respect to the compression-bonding member.

An apparatus for forming compression-bonding portions in a continuous body of a web member including a fiber bundle, while conveying the continuous body in a predetermined direction set as a direction of conveyance, the fiber bundle being continuous in the predetermined direction while a fiber direction is set along the predetermined direction, the compression-bonding portions being formed at intervals in the direction of conveyance, the apparatus comprising: a conveying apparatus configured to rotate a rotator around a rotation axis along a CD direction intersecting with the direction of conveyance, while holding the continuous body of the web member on an outer peripheral surface of the rotator, to convey the continuous body of the web member in a direction of rotation of the rotator set as the direction of conveyance; a compression-bonding member configured to compress a formation target part of each of the compression-bonding portions in the continuous body of the web member, in corporation with the rotator when the formation target part passes through a predetermined position in the direction of rotation, to form the compression-bonding portions; and a pressing member disposed to be opposed to the outer peripheral surface of the rotator at a position upstream in the direction of rotation from the compression-bonding member, the pressing member being configured to press the continuous body of the web member to an inside in a radial direction of rotation of the rotator, while avoiding forming the compression-bonding portion in the continuous body of the web member.

Other features of the present disclosure will be become apparent from descriptions of the present specification and of the accompanying drawings.

Advantageous Effects

According to the present disclosure, a compression-bonding portion such as a welding portion can be formed in a continuous body of a web member, in a state where unevenness in fiber distribution in a CD direction of a fiber bundle is reduced.

DESCRIPTION OF EMBODIMENTS

Figure 1:
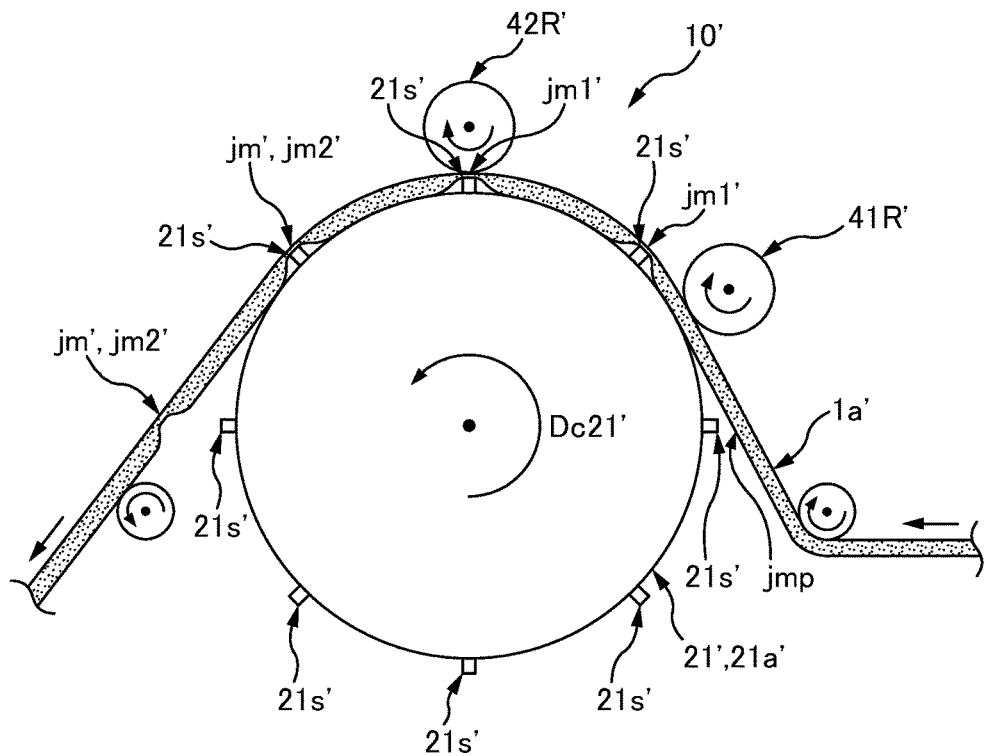
FIG. 1 is a schematic side view illustrating a reference example of a heat sealing apparatus 10' provided to form a compression-bonding portion jm'.
Figure 2:
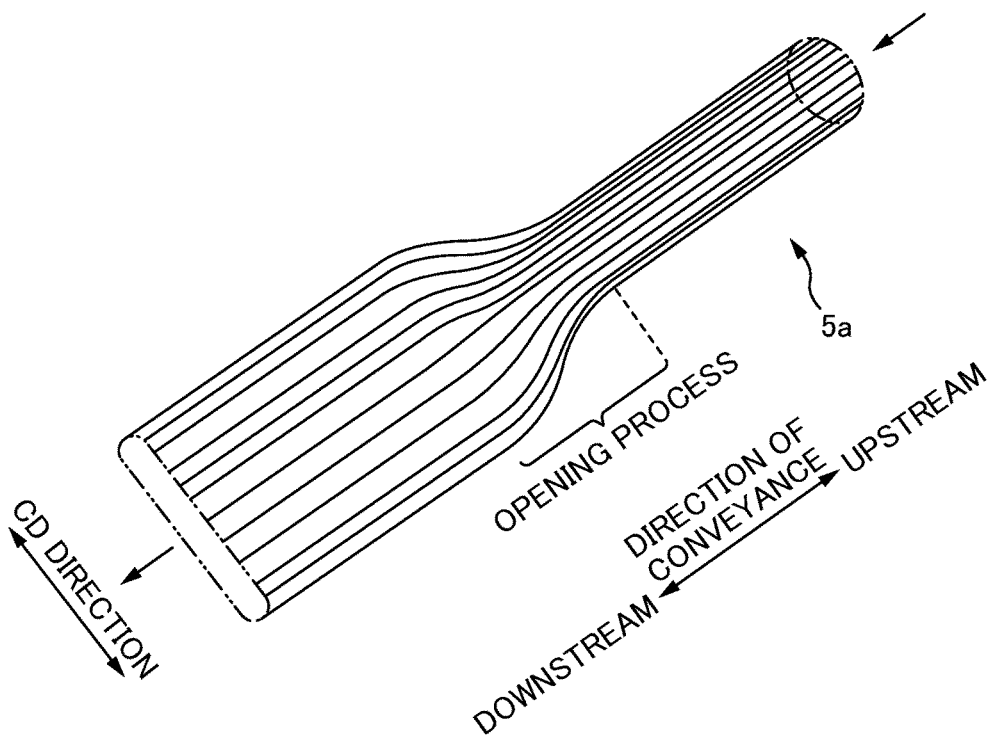
FIG. 2 is a schematic perspective view illustrating a state in which a fiber bundle 5a is opened in the CD direction.

At least the following matters are made clear from the Description and Drawings described below.

A method for forming compression-bonding portions in a continuous body of a web member including a fiber bundle, while conveying the continuous body in a predetermined direction set as a direction of conveyance, the fiber bundle being continuous in the predetermined direction while a fiber direction is set along the predetermined direction, the compression-bonding portions being formed at intervals in the direction of conveyance, the method comprising: rotating a rotator around a rotation axis along a CD direction intersecting with the direction of conveyance, while holding the continuous body of the web member on an outer peripheral surface of the rotator, to convey the continuous body of the web member in a direction of rotation of the rotator set as the direction of conveyance; compressing a formation target part of each of the compression-bonding portions in the continuous body of the web member, using a compression-bonding member and the rotator, when the formation target part passes through a position of the compression-bonding member disposed at a predetermined position in the direction of rotation, to form the compression-bonding portions; and pressing the continuous body of the web member to an inside in a radial direction of rotation of the rotator using a pressing member, while avoiding forming the compression-bonding portions in the continuous body of the web member, the pressing member being disposed to be opposed to the outer peripheral surface of the rotator, at a position upstream in the direction of rotation with respect to the compression-bonding member.

With the method for forming the compression-bonding portions in the continuous body of the web member including the fiber bundle, the pressing member presses the continuous body of the web member to the inside in the radial direction of rotation, at the position upstream in the direction of rotation from the compression-bonding member. Based on this pressing operation, fibers of the fiber bundle can be moved in the CD direction such that unevenness in fiber distribution in the CD direction of the fiber bundle is reduced. For example, the pressing force is likely to be larger in a portion having a large amount of fibers in the CD direction while the pressing force is likely to be smaller in a portion having a smaller amount of fibers. This moves the fibers in the CD direction such that the fibers are forced from the portion having a lager amount of fibers to the portion having a smaller amount of fibers. Accordingly, the compression-bonding portion can be formed in the continuous body of the web member in a state where such unevenness has been reduced.

In the method for forming the compression-bonding portions in the continuous body of the web member including the fiber bundle, it is preferable that the pressing member includes a pressing roll configured to rotate around a rotation axis along the CD direction while contacting the continuous body of the web member, an outer peripheral surface of the pressing roll is capable of being pressed to an inside in a radial direction of rotation of the rotator using a pressing mechanism, the outer peripheral surface of the rotator has a shape including a part displaced in the radial direction of rotation corresponding to a position of the direction of rotation, and an amount of pressing onto the outer peripheral surface of the pressing roll is changed with a rotation operation of the rotator.

With the method for forming the compression-bonding portions in the continuous body of the web member including the fiber bundle, the pressing roll can change the amount of pressing performed onto the outer peripheral surface thereof to the inside in the radial direction of rotation. Accordingly, irrespective of the shape of the outer peripheral surface of the rotator, the continuous body of the web member can be pressed across substantially all the length thereof using the pressing roll.

Further, the pressing roll can periodically press the continuous body of the web member to the inside in the radial direction of rotation. With such a periodical pressing operation, the vibration of the periodical pressing operation is transmitted to the continuous body of the web member, thereby being able to effectively move the fibers of the fiber bundle in the CD direction. As a result, the unevenness in fiber distribution in the CD direction of the fiber bundle can be reliably reduced.

In the method for forming the compression-bonding portions in the continuous body of the web member including the fiber bundle, it is preferable that a plurality of supporting portions are provided to the outer peripheral surface of the rotator in such a manner as to protrude at intervals of an angle to the direction of rotation, the angle corresponding to a product pitch of the web member, the supporting portions being configured to support the formation target parts in the continuous body of the web member, when each of the supporting portions passes through the position of the compression-bonding member in the direction of rotation, the supporting portion compresses each of the formation target parts in corporation with the compression-bonding member, when the supporting portion passes through the position of the pressing member, the supporting portion presses the pressing member to an outside in the radial direction of rotation, such that the pressing member is moved to the outside in the radial direction of rotation, and when a part between the supporting portions in the direction of rotation passes through a position of the pressing member, the pressing member is moved to the inside in the radial direction of rotation based on a pressing force to the inside in the radial direction of rotation exerted by the pressing member.

With the method for forming the compression-bonding portions in the continuous body of the web member including the fiber bundle, the pressing member is configured to reciprocate to the inside and outside in the radial direction of rotation. Accordingly, irrespective of the shape of the outer peripheral surface of the rotator, the continuous body of the web member can be pressed over substantially all the length thereof using the pressing member.

Further, with the pressing member configured to reciprocate, the vibration of such reciprocation is transmitted to the continuous body of the web member. This can effectively move the fibers of the fiber bundle in the CD direction. As a result, the unevenness in fiber distribution in the CD direction of the fiber bundle can be reliably reduced.

In the method for forming the compression-bonding portions in the continuous body of the web member including the fiber bundle, it is preferable that the supporting portion is configured to support the continuous body of the web member at a top surface of the supporting portion, and a plurality of recessed portions are formed, in alignment in the CD direction, in the top surface.

With the method for forming the compression-bonding portions in the continuous body of the web member including the fiber bundle, in the above-described top surface, a plurality of recessed portions are formed in alignment in the CD direction. Thus, fibers at non-recessed portions can be pushed out toward recessed portions, based on the difference in magnitude between the compressing force at the recessed portion and the compression force at the non-recessed portion. Such pushing out function becomes more remarkable as the amount of the fibers at the non-recessed portions is increased. Accordingly, the fibers distributed greater in the non-recessed portions in an uneven manner can be effectively forced toward the recessed portions. This also effectively contributes to the reduction in unevenness in fiber distribution in the CD direction of the fiber bundle.

In the method for forming the compression-bonding portions in the continuous body of the web member including the fiber bundle, it is preferable that the continuous body of the web member is in contact with an auxiliary roll such that the continuous body of the web member is held on the outer peripheral surface of the rotator from a position upstream, in the direction of rotation, with respect to a pressing position of the pressing member, the auxiliary roll being configured to rotate around a rotational axis along the CD direction, and the pressing member is configured to press the continuous body of the web member held on the outer peripheral surface of the rotator to the inside in the radial direction of rotation.

With the method for forming the compression-bonding portions in the continuous body of the web member including the fiber bundle, the pressing member is configured to press the continuous body of the web member in a state where the continuous body of the web member is held onto the outer peripheral surface of the rotator. Accordingly, it is possible to stably press the continuous body of the web member.

In the method for forming the compression-bonding portions in the continuous body of the web member including the fiber bundle, it is preferable that the pressing member includes a pressing roll, the pressing roll being configured to press the continuous body of the web member to the inside in the radial direction of rotation, while rotating around an rotation axis along the CD direction, and the pressing roll is configured to function also as a winding roll, the winding roll being configured to wind and hold the continuous body of the web member around the rotator from a position upstream, in the direction of rotation, with respect to the compression-bonding member.

With the method for forming the compression-bonding portions in the continuous body of the web member including the fiber bundle, the pressing roll can perform also such a function of winding and holding the continuous body of the web member around the rotator from the position upstream, in the direction of rotation, from the compression-bonding member, in addition to the function of pressing the continuous body of the web member to reduce the unevenness in fiber distribution. Accordingly, the number of parts can be reduced as compared with the case where such two functions are respectively divided into two rolls.

An apparatus for forming compression-bonding portions in a continuous body of a web member including a fiber bundle, while conveying the continuous body in a predetermined direction set as a direction of conveyance, the fiber bundle being continuous in the predetermined direction while a fiber direction is set along the predetermined direction, the compression-bonding portions being formed at intervals in the direction of conveyance, the apparatus comprising: a conveying apparatus configured to rotate a rotator around a rotation axis along a CD direction intersecting with the direction of conveyance, while holding the continuous body of the web member on an outer peripheral surface of the rotator, to convey the continuous body of the web member in a direction of rotation of the rotator set as the direction of conveyance; a compression-bonding member configured to compress a formation target part of each of the compression-bonding portions in the continuous body of the web member, in corporation with the rotator when the formation target part passes through a predetermined position in the direction of rotation, to form the compression-bonding portions; and a pressing member disposed to be opposed to the outer peripheral surface of the rotator at a position upstream in the direction of rotation from the compression-bonding member, the pressing member being configured to press the continuous body of the web member to an inside in a radial direction of rotation of the rotator, while avoiding forming the compression-bonding portion in the continuous body of the web member.

With the apparatus for forming the compression-bonding portions in the continuous body of the web member including the fiber bundle, such effects similar to the case of the above-described manufacturing method can be exerted.

Embodiment

Figure 3:
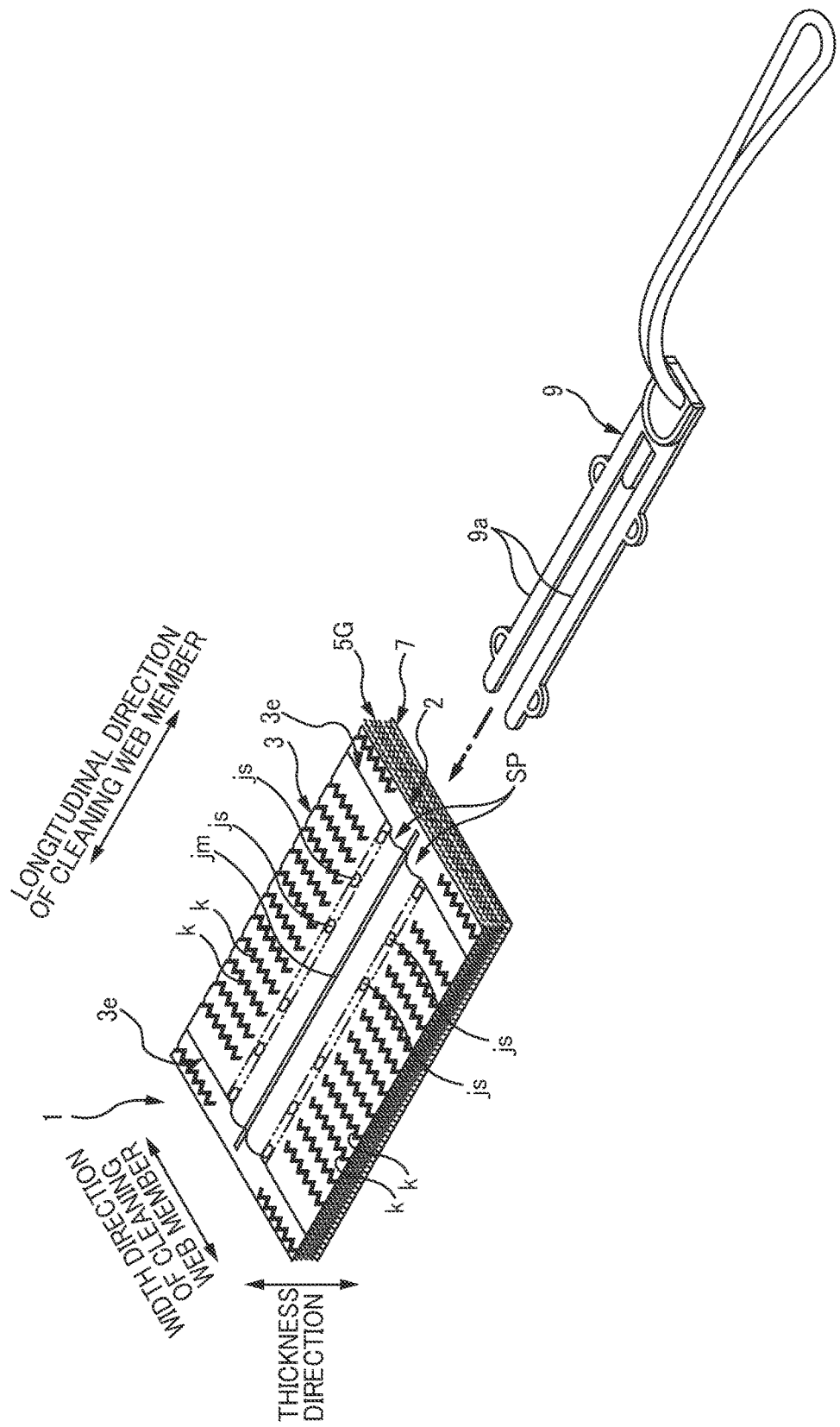
FIG. 3 is a perspective view illustrating a cleaning web member 1 manufactured using a method and an apparatus 10 for forming a compression-bonding portion jm according to an embodiment of the present disclosure.
Figure 4A:
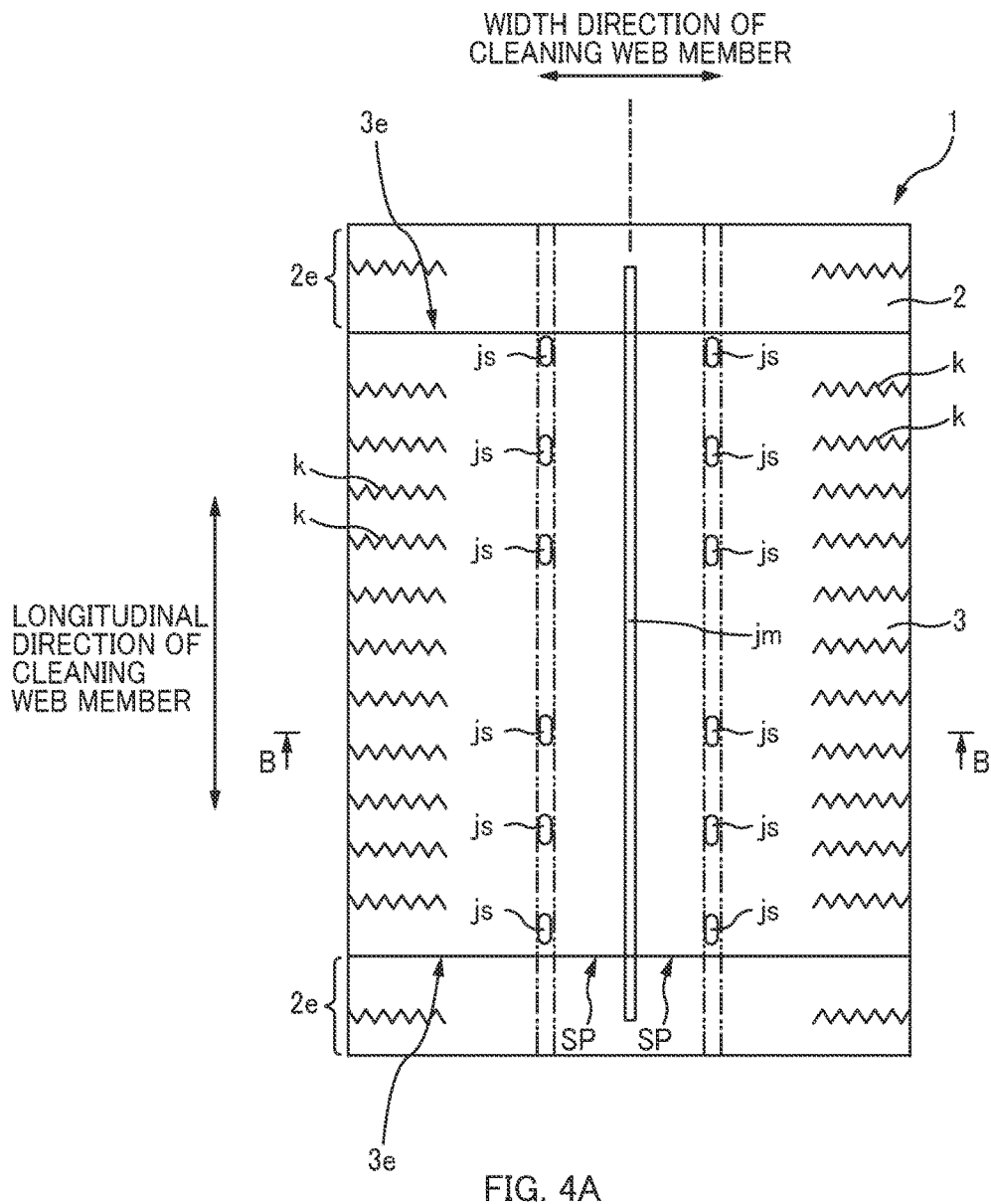
FIG. 4A is a plan view of a cleaning web member 1.

FIG. 3 is a perspective view of a cleaning web member 1 manufactured using a method and an apparatus 10 for forming a compression-bonding portion according to an embodiment of the present disclosure. FIG. 4A is a plan view of the cleaning web member 1, and FIG. 4B is a cross-sectional view of the cleaning web member 1 taken along line B-B in FIG. 4A.

As illustrated in FIGS. 3 and 4A, this cleaning web member 1 has a planar shape of a substantially rectangular shape having a longitudinal direction and a width direction. As illustrated in FIGS. 3 and 4B, a base material sheet 2, an auxiliary sheet 3, a fiber bundle member 5G, and a oblong sheet 7 are disposed in a thickness direction. The auxiliary sheet 3 covers a top surface of the base material sheet 2. The fiber bundle member 5G covers a lower surface of the base material sheet 2 to serve as a main brush portion. The oblong sheet 7 is disposed at a lower surface with respect to the fiber bundle member 5G to serve as an auxiliary brush portion. Between the auxiliary sheet 3 and the base material sheet 2, void portions SP and SP are formed such that a handle member 9 is inserted into the void portions SP and SP to be fixed. Accordingly, two-forked insertions 9a and 9a of the handle member 9 are inserted into these void portions SP and SP. Thus, the cleaning web member 1 is used for cleaning of, for example, a desk with the lower surface and both ends, in the width direction, of the cleaning web member 1 as wiping surfaces.

Figure 4B:
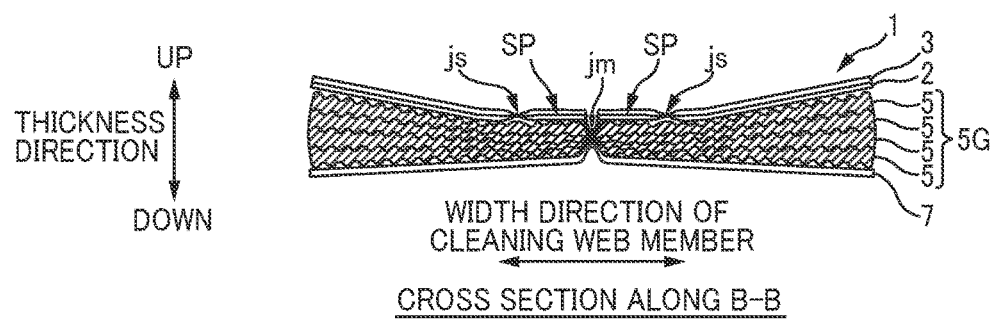
FIG. 4B is a cross-sectional view of a cleaning web member 1 taken along line B-B in FIG. 4A.

As illustrated in FIG. 4B, the fiber bundle member 5G is a member of a plurality of bundles of fiber bundles 5, 5 . . . stacked in a thickness direction. Although, in this example, the four fiber bundles 5, 5 . . . are stacked in the thickness direction as one example of the plurality of bundles, the number of the fiber bundles 5, 5 . . . of the fiber bundle member 5G is not limited to this. For example, the number of the fiber bundles 5, 5 . . . may be one bundle, two bundles, three bundles, or the like.

The fiber bundles 5 each include tows having a fineness of, for example, 3.5 dtex (diameter of 18 to 25 μm) as a large number of continuous fibers. However, the fineness of the tow is not limited to 3.5 dtex. For example, a given value may be selected from a range of 1.1 to 10 dtex (diameter of about 6 to about 60 μm), and further the respective fiber bundles 5 may include the tows having a plurality of finenesses in a range of 1.1 to 10 dtex.

The fiber directions of the fiber bundles 5 are along the width direction of the cleaning web member 1. That is, the longitudinal directions of the tows are along the width direction of the cleaning web member 1. This basically forms both ends in the width direction as distal end portions of the brush portion. Note that, since these tows are flexibly bent and deformable, bending the distal end portions of the tows to the lower surface side of the cleaning web member 1 allows the lower surface to serve as the distal end portion of the brush portion. In this example, all the fibers of the fiber bundles 5 are configured with the tows; however, this should not be construed in a limiting sense. That is, the fiber bundle 5 may include a fiber other than the tow.

Here, the tow is a fiber made of a continuous filament and is a fiber made of a single component such as polyethylene terephthalate (PET), polypropylene (PP), and polyethylene (PE), a composite fiber with a sheath-core structure whose sheath/core is PE/PET and PE/PP, or a side-by-side composite fiber such as PE/PET and PE/PP. Further, the cross-sectional shape may be a circular shape or a shape other than the circular shape. The fiber may have a crimp, and in this case, a crimper process is performed when the filaments are a manufactured. Furthermore, the number of crimps is increased with a preheat calendar or hot air treatment. A transport roll transports the crimped tows. At this time, a tensile force is provided to the tows in longitudinal directions of the filaments, and the tensile force is released. Repeating this process opens the continuous filaments of the tows so as to be individually separated into pieces.

As illustrated in FIGS. 3, 4A, and 4B, the base material sheet 2 and the auxiliary sheet 3 both have a substantially rectangular shape in planar shape. While the lengths thereof in the width direction are set to the same dimensions as one another, the length in the longitudinal direction of the base material sheet 2 is set longer than that of the auxiliary sheet 3. Accordingly, the auxiliary sheet 3 is stacked on the base material sheet 2 such that both ends 2e and 2e of the base material sheet 2 in the longitudinal direction protrude, by a predetermined length, to the outside from both ends 3e and 3e of the auxiliary sheet 3 in the longitudinal direction.

In this example, both the base material sheet 2 and the auxiliary sheet 3 have zigzag slits k, k . . . along the width direction, with intervals in the longitudinal direction, at respective end portions in the width direction. These slits k, k . . . form a plurality of zigzag strip pieces along the width direction at the end portions, in the width direction, of the base material sheet 2 and the auxiliary sheet 3. Note that these slits k, k . . . may be omitted.

The base material sheet 2 and the auxiliary sheet 3 are, for example, made of a nonwoven fabric containing a thermoplastic fiber. The thermoplastic fiber includes, for example, PE, PP, and PET fibers, a composite fiber of PE and PET (for example, a composite fiber having a sheath-core structure in which core is PE and sheath is PET), and a composite fiber of PE and PP (for example, a composite fiber having a sheath-core structure in which core is PET and sheath is PE). An aspect of the nonwoven fabric is, for example, a thermally bonded nonwoven fabric, a spunbonded nonwoven fabric, and a spunlace nonwoven fabric. Note that the materials of these base material sheet 2 and auxiliary sheet 3 are not limited to the nonwoven fabric. For example, the materials may be a woven fabric or a film.

The oblong sheet 7 is formed of a flexible sheet such as a nonwoven fabric containing a thermoplastic fiber or a thermoplastic resin film. The oblong sheet 7 is formed into a substantially rectangular shape having the same planar surface size as that of the base material sheet 2. At end portions in the width direction of the oblong sheet 7, zigzag slits (not illustrated) are formed along the width direction with intervals in the longitudinal direction. These slits form a plurality of zigzag strip pieces (not illustrated) along the width direction at the end portions in the width direction of the oblong sheet 7. Note that this oblong sheet 7 may be omitted.

These auxiliary sheet 3, base material sheet 2, fiber bundle member 5G of all of the four fiber bundles 5, 5, 5, and 5, and oblong sheet 7 are stacked in the thickness direction in this order. As illustrated in FIGS. 4A and 4B, these sheets 2, 3, and 7 and the fiber bundles 5, 5 . . . are integrally joined by being compressed in the thickness direction substantially at the center in the width direction in the stacked state to form a main joining portion jm into a depressed shape. In this example, such a main joining portion jm is formed like one straight-line groove along the longitudinal direction; however, this should not be construed in a limiting sense. For example, the main joining portion may be formed with the grooves in a plurality of line segments along the longitudinal direction spaced in the longitudinal direction, or a form other than these forms. In this example, the main joining portion jm is configured as a welding portion where the sheets 2, 3, and 7 and the fiber bundles 5, 5 . . . are each melted and bonded; however, this should not be construed in a limiting sense by any means. For example, the main joining portion jm may be the compression-bonding portion configured such that the sheets 2, 3, and 7 and the fiber bundles 5, 5 . . . are press-bonded. Incidentally, it also can be said that the welding portion is one kind of the compression-bonding portion. Needless to say, with such a main joining portion jm, the tows, which are fibers, of the fiber bundles 5 are welded to be integrally fixed, which restrains the tows from falling off.

A plurality of auxiliary joining portions js, js . . . , which join the auxiliary sheet 3 and the base material sheet 2 together by welding or the like, are formed to be aligned in the longitudinal direction at positions on both sides of this main joining portion jm in the width direction. By virtue of these auxiliary joining portions js, js . . . , the aforementioned void portions SP and SP, into which the handle member 9 is inserted between the auxiliary sheet 3 and the base material sheet 2 to be fixed, at positions between the main joining portion jm and the auxiliary joining portions js, js . . . .

Such cleaning web members 1 are manufactured on a manufacturing line. The manufacturing line includes the heat sealing apparatus 10 as one example of a formation apparatus, which is configured to form the above-described main joining portion jm.

Figure 5A:
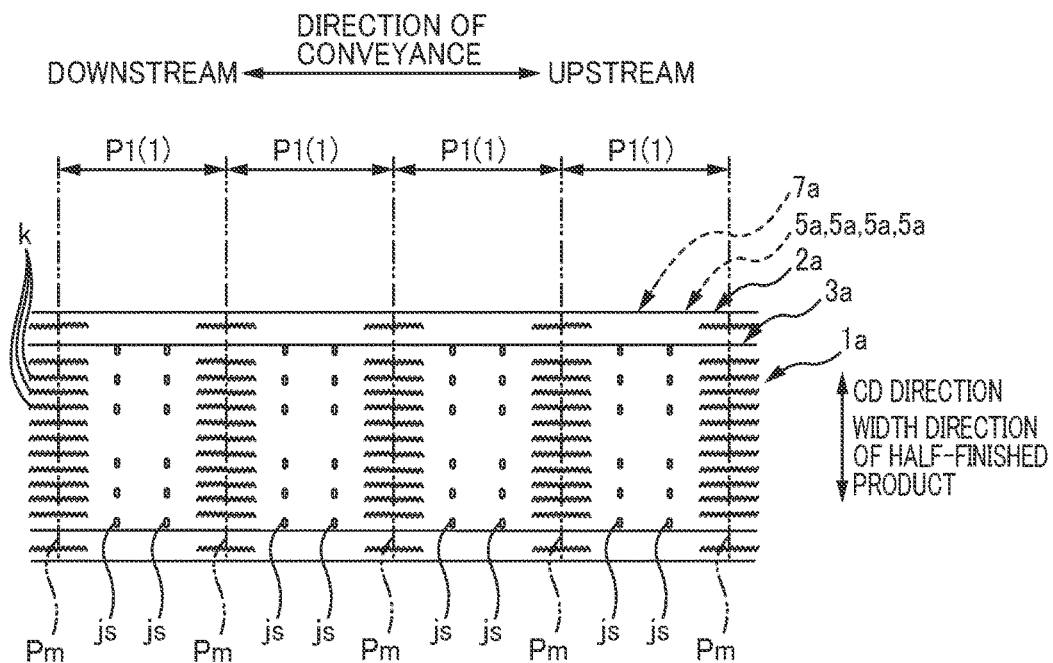
FIG. 5A is a schematic plan view of half-finished products 1a of a cleaning web members 1 immediately before being sent to a heat sealing apparatus 10 as one example of a formation apparatus according to an embodiment of the present disclosure.

FIG. 5A is a schematic diagram of half-finished products 1a (corresponding to a continuous body of the web member) of the cleaning web members 1 immediately before being sent to this heat sealing apparatus 10. At this time, the half-finished products 1a are in a state of a continuous body 1a in which the plurality of cleaning web members 1, 1 . . . with the main joining portion jm unformed are connected in the width direction. That is, in the half-finished products 1a, auxiliary sheets 3s, the base material sheets 2, and the oblong sheets 7 are individually in a state of continuous sheets 3a, 2a, and 7a continuous in the width direction. The four fiber bundles 5, 5 . . . are also in a state of continuous bodies 5a, 5a . . . continuous in the width direction. The continuous sheet 3a of the auxiliary sheet, the continuous sheet 2a of the base material sheets, the continuous bodies 5a, 5a . . . of the four fiber bundles, and the continuous sheet 7a of the oblong sheets are stacked in the thickness direction in this order. The continuous sheet 3a of the auxiliary sheets and the continuous sheet 2a of the base material sheets have already been joined with the auxiliary joining portions js, js . . . .

Figure 5B:
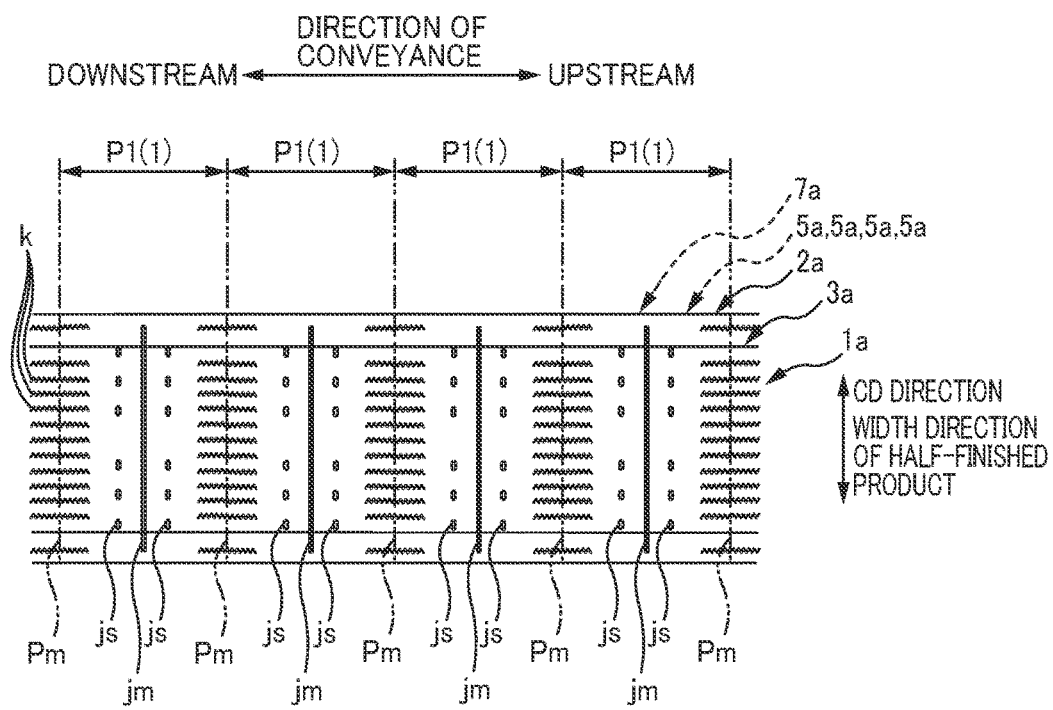
FIG. 5B is a schematic plan view of half-finished products 1a after half-finished products 1a pass the apparatus 10.

As illustrated in FIG. 5B, while the heat sealing apparatus 10 are conveying the half-finished products 1a in a direction in which the half-finished products 1a continue, which serves as the direction of conveyance, the heat sealing apparatus 10 forms the main joining portions jm on the half-finished products 1a at a product pitch P1 in the direction of conveyance. Then, the half-finished products 1a in which the main joining portions jm formed are conveyed to a cutting apparatus (not illustrated) positioned downstream from the heat sealing apparatus 10. The apparatus is configured to cut at each intermediate position Pm, as a cutting target position, between the main joining portions jm and jm immediately adjacent to each another in the direction of conveyance, and the cleaning web members 1 are formed as described hereinabove.

As illustrated in FIGS. 5A and 5B, in the heat sealing apparatus 10, a direction corresponding to the width direction of the half-finished product 1a is referred to as a "CD direction." Three directions, which are the CD direction, the direction of conveyance, and the thickness direction of the half-finished product 1a, are in such a relationship as to be orthogonal to one another.

Figure 6B:
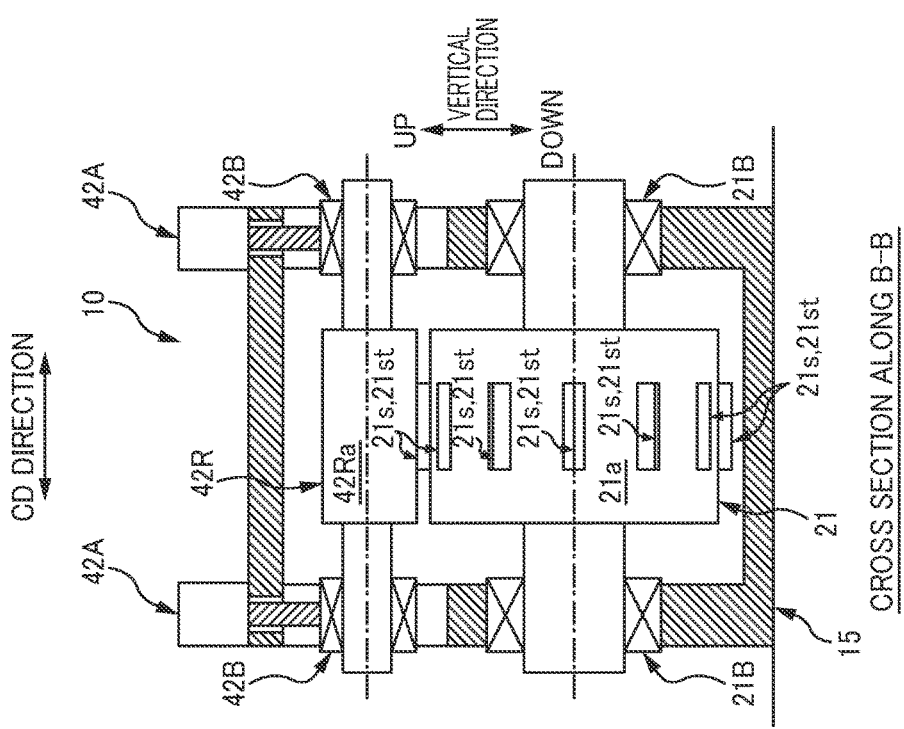
FIG. 6B is an arrow view taken along line B-B in FIG. 6A.
Figure 6A:
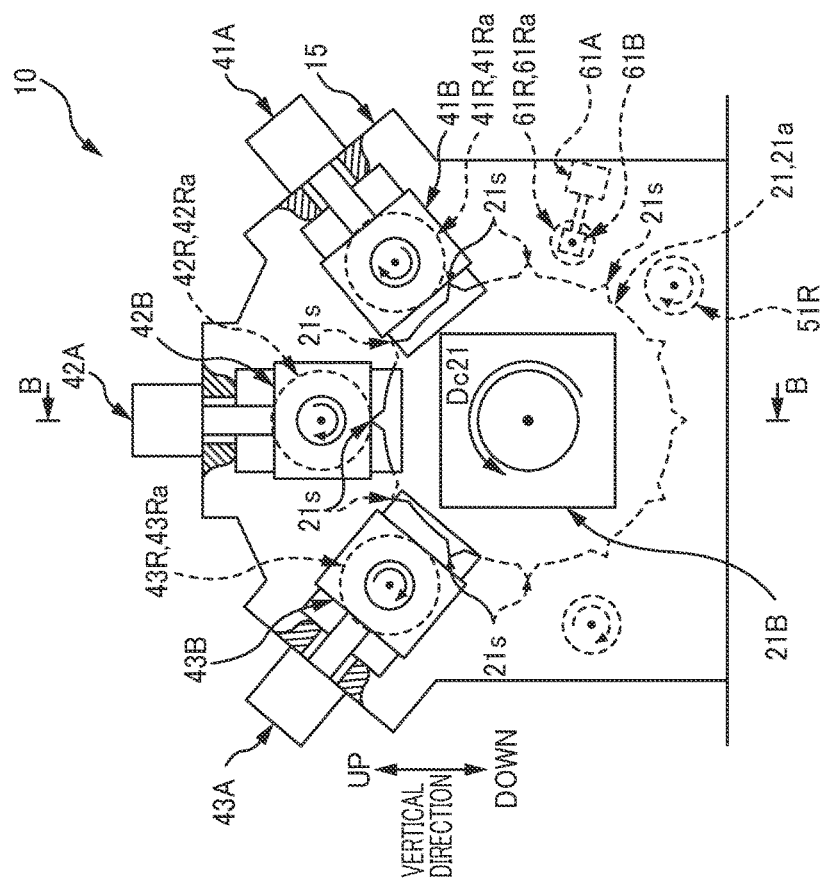
FIG. 6A is a schematic side view of an apparatus 10.
Figure 7:
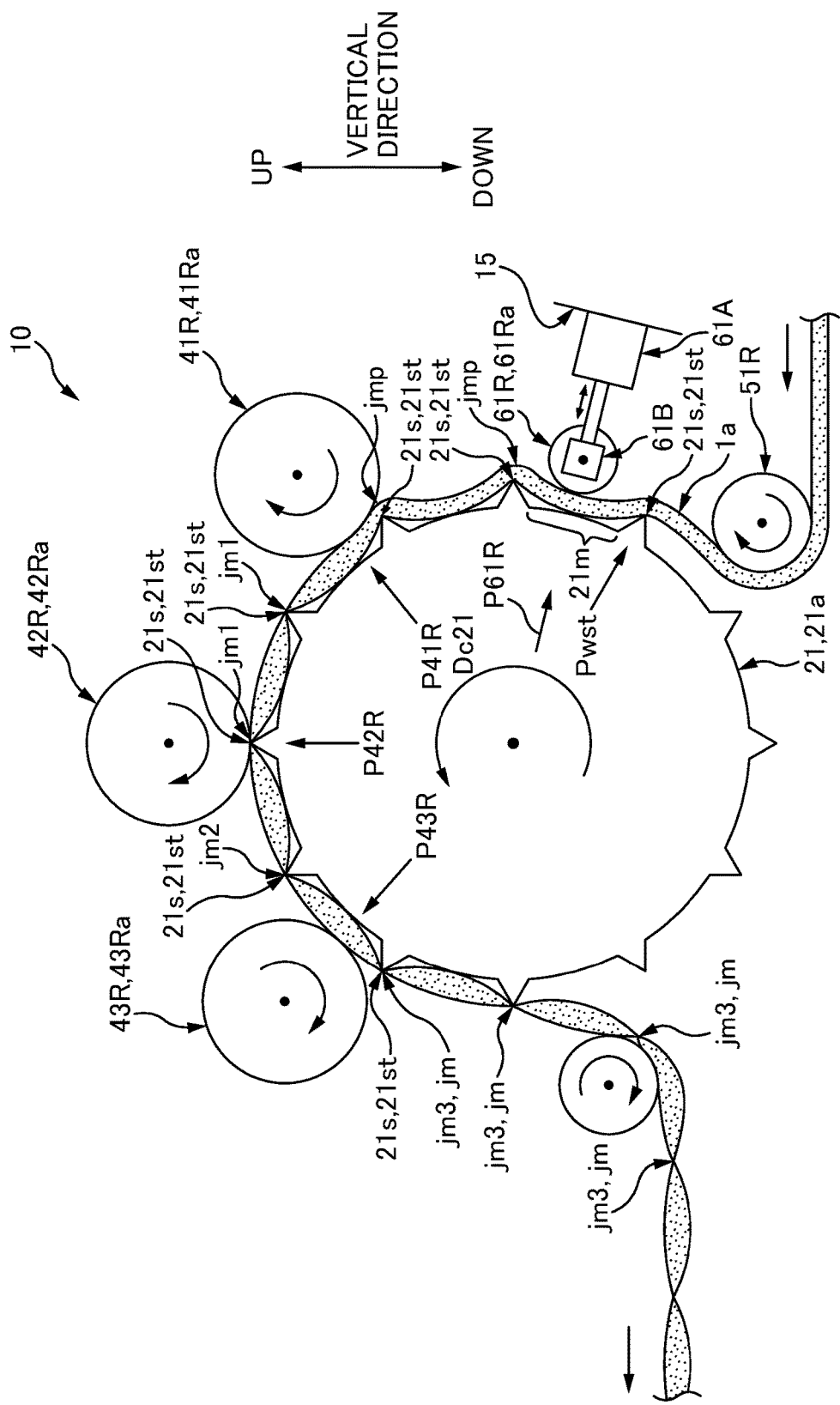
FIG. 7 is a schematic side view illustrating only a main configuration (a rotating drum 21, first to third seal rolls 41R, 42R, and 43R, an auxiliary roll 51R, and a pressing roll 61R) of an apparatus 10.

FIG. 6A is a schematic side view of the heat sealing apparatus 10, and FIG. 6B is an arrow view taken along line B-B in FIG. 6A. FIG. 7 is a schematic side view illustrating only a main configuration (a rotating drum 21, first to third seal rolls 41R, 42R, and 43R, an auxiliary roll 51R, and a pressing roll 61R) of the apparatus 10. To avoid complication of the drawings, FIGS. 6A and 6B do not illustrate the half-finished product 1a. FIG. 6A illustrates a cutaway view of a part of a housing 15 of the apparatus 10 and the like. FIG. 6B illustrates a part of the configuration of the apparatus 10 (for example, the seal roll 42R and the rotating drum 21) in front view.

As illustrated in FIGS. 6A and 6B, the heat sealing apparatus 10 includes the rotating drum 21, the first to the third seal rolls 41R, 42R, and 43R, and the housing 15. The rotating drum 21 serves as one example of a rotator configured to drive to rotate around a rotation axis that is along the CD direction. The first to the third seal rolls 41R, 42R and 43R are disposed at three positions, in a direction of rotation Dc21, of the rotating drum 21 in such a manner as to be opposed to an outer peripheral surface 21a of the rotating drum 21. The housing 15 supports these rotating drum 21 and first to third seal rolls 41R, 42R and 43R.

As illustrated in FIG. 7, in the apparatus 10, the half-finished products 1a are wound around the outer peripheral surface 21a of the rotating drum 21. With the half-finished products 1a being held in a state where a relative sliding hardly occurs, the apparatus 10 conveys the half-finished products 1a in the direction of rotation Dc21 through a driving rotation of the rotating drum 21. The first to the third seal rolls 41R, 42R, and 43R are disposed in a range where the half-finished products 1a are wound around, with their outer peripheral surfaces 41Ra, 42Ra, and 43Ra being opposed to the outer peripheral surface 21a of the rotating drum 21.

Accordingly, as illustrated in FIG. 7, when a formation target part jmp, where the main joining portion jm is to be formed in the half-finished product 1a, passes through a position P41R of the first seal roll 41R, which is positioned at the most upstream in the range where the half-finished products 1a are wound around, this formation target part jmp is compressed by the first seal roll 41R and the rotating drum 21, thereby forming a welding portion jm1 of a first stage. When the welding portion jm1 of this first stage passes through a position P42R of the second seal roll 42R, which is positioned downstream from the first seal roll 41R, the welding portion jm1 of the first stage is further compressed by the second seal roll 42R and the rotating drum 21, thereby forming a welding portion jm2 of a second stage. Furthermore, when the welding portion jm2 of this second stage passes through a position P43R of the third seal roll 43R, which is positioned downstream from the second seal roll 42R, the welding portion jm2 of the second stage is further compressed by the third seal roll 43R and the rotating drum 21, thereby forming a welding portion jm3 of a third stage. This welding portion jm3 of the third stage corresponds to the above-described main joining portion jm, the main joining portion jm is formed in the half-finished product 1a as described hereinabove.

The following describes the rotating drum 21, the first to the third seal rolls 41R, 42R, and 43R, and the like in detail.

As illustrated in FIG. 6A, the rotating drum 21 is rotatably supported around the rotation axis at a fixed position along the CD direction using a bearing member (s) 21B fixed to the housing 15 in such a manner as to be substantially immovable. The rotating drum 21 is coupled to a servomotor (not illustrated), which serves as a driving source, via an appropriate power transmission mechanism (not illustrated), such as a pulley and a timing belt. This drives the rotating drum 21 to rotate around the rotation axis, and this driving rotation operation is controlled so as to associate with a conveyance velocity (m/minute) of the half-finished products 1a conveyed from the upstream side in the direction of conveyance to the rotating drum 21, based on a synchronous signal or the like. Accordingly, while the rotating drum 21 is restraining the half-finished products 1a from being extremely pulled and extremely loosened in the direction of conveyance, the rotating drum 21 ensures holding the half-finished products 1a on the outer peripheral surface 21a.

As illustrated in FIG. 6A, a plurality of supporting portions 21s, 21s . . . are provided to protrude at the outer peripheral surface 21a of the rotating drum 21 at intervals of an angle, to the direction of rotation Dc21, corresponding to the product pitch P1 of the half-finished products 1a. For example, in this example, 12 pieces of the supporting portions 21s and 21s are provided to protrude at intervals of 30° in the direction of rotation Dc21.

Accordingly, with the supporting portions 21s in FIG. 7 digging into the half-finished products 1a in the thickness direction, the half-finished products 1a can be held on the outer peripheral surface 21a of the rotating drum 21 in such a manner as to be substantially relatively immovable. Note that, in order to hold these half-finished products 1a to be substantially relatively immovable with more reliability, a plurality of intake holes (not illustrated) may be provided on the outer peripheral surface 21a of the rotating drum 21, and through such intake air from these intake holes, the half-finished products 1a may be suctioned to be held to the outer peripheral surface 21a.

Further, as illustrated in FIG. 6B, a top surface 21st of the supporting portion 21s is formed in a straight line along the CD direction, with a smooth surface substantially without a depression, corresponding to the linear shape of the above-described main joining portion jm. As has been described, the supporting portion 21s bites into the half-finished product 1a in such a manner as to be substantially relatively immovable.

Accordingly, as illustrated in FIG. 7, when the top surface 21st of the supporting portion 21s passes through the positions P41R, P42R, and P43R of the first to the third seal rolls 41R, 42R, and 43R, the top surface 21st compresses the same part jmp of the half-finished product 1a in corporation with all the rolls of the first to the third seal rolls 41R, 42R, and 43R. This enables the degree of welding in the formation target part jmp of the main joining portion jm to be increased in a stepwise manner such as the first stage, the second stage, and the third stage. This effectively contributes to the formation of the main joining portion jm with a high degree of welding, while restraining broken weld (break in the formation target part jmp that may be caused by increase in amount of compression at a time).

Since this apparatus 10 is the heat sealing apparatus 10, a heating element (not illustrated) configured to heat the outer peripheral surface 21a of the rotating drum 21 is incorporated in the rotating drum 21, and the amount of the heat generation of the heating element is adjusted to adjust a temperature of the outer peripheral surface 21a. Although a target temperature of the outer peripheral surface 21a is determined according to the materials constituting the half-finished product 1a, the target temperature is basically set to an appropriately temperature equal to or less than a melting point of a material having the lowest melting point among the materials. The heating element (s) is (are) disposed at (a) position (s) point symmetric to the rotation axis of the rotating drum 21 such that the outer peripheral surface 21a of the rotating drum 21 is equally heated across the whole circumference thereof. For example, one housing hole (not illustrated) to house the substantially rod-shaped heating element along the rotation axis direction may be formed, with the center of the hole being matched with the rotation axis. Alternatively, a plurality of housing holes may be formed at positions at which the whole circumference of the rotating drum 21 is equally divided in the direction of rotation and also the positions at which the housing holes have an equal distance from the rotation axis in a radial direction of rotation, to house the heating elements into the housing holes, respectively.

Meanwhile, the first to the third seal rolls 41R, 42R, and 43R are respectively configured to be, for example, flat rolls whose outer peripheral surfaces 41Ra, 42Ra, and 43Ra are smooth. As illustrated in FIG. 6A, the seal rolls 41R, 42R and 43R are individually rotatably supported by bearing members 41B, 42B, and 43B around the rotation axis that is along the CD direction. Further, the seal rolls 41R, 42R and 43R each are coupled to the servo motor (not illustrated), which serves as a driving source, via an appropriate power transmission mechanism (not illustrated) such as a pulley and a timing belt. This drives the seal rolls 41R, 42R and 43R to rotate around the rotation axis, and this driving rotation operation is controlled so as to associate with a conveyance velocity (m/minute) of the half-finished products 1a, based on asynchronous signal or the like, similarly to the aforementioned rotating drum 21. Accordingly, when compressing the half-finished products 1a in corporation with the rotating drum 21, the seal rolls 41R, 42R and 43R can smoothly compress half-finished products 12a while restraining an excessive load on the half-finished products 1a that may cause, for example, shearing.

The bearing members 41B, 42B, and 43B of the seal rolls 41R, 42R and 43R are supported to reciprocate in the radial direction of rotation of the rotating drum 21 (direction of contact with/separation from the rotating drum 21) via actuators 41A, 42A, and 43A, such as hydraulic cylinders fixed to the housing 15. Accordingly, the actuators 41A, 42A, and 43A can be controlled to adjust the size of the spaces between the seal rolls 41R, 42R and 43R and the rotating drum 21 or the magnitude of a pressing force (N) in the radial direction of rotation. The size of the spaces or the magnitude of the pressing force (N) are adjusted individually for the seal rolls 41R, 42R and 43R such that required degrees of welding can be respectively achieved at the positions of the seal rolls 41R, 42R and 43R. For example, in this example, the spaces are individually adjusted such that the spaces at the time of compression decrease in the order of the first seal roll 41R, the second seal roll 42R, and the third seal roll 43R. This achieves the aforementioned stepwise increase in the degree of welding.

Incidentally, when hydraulic cylinders are used as the actuators 41A, 42A, and 43A, such individual adjustments of the spaces can be made, for example, as follows. That is, the individual adjustments can be made such that pressure values (Pa) of hydraulic oil serving as a working fluid supplied to the hydraulic cylinders 41A, 42A, and 43A are adjusted using a pressure regulation mechanism such as a pressure regulation valve. The sizes of the spaces can be obtained through, for example, experiments using an actual apparatus. That is, while the sizes of the spaces are changed in a plurality of levels, the half-finished products 1a are allowed to pass through the heat sealing apparatus 10, and thereafter, the states of the welding portions jm of the half-finished products 1a are checked, thereby being able to obtain the sizes of the spaces.

These first to third seal rolls 41R, 42R, and 43R also internally incorporate the heating elements (not illustrated), respectively, to heat the outer peripheral surfaces 41Ra, 42Ra, and 43Ra. The amounts of heat generation of the heating elements are respectively adjusted to adjust the temperatures of the outer peripheral surfaces 41Ra, 42Ra, and 43Ra. The basic concept of the incorporating positions and the target temperature of the outer peripheral surfaces 41Ra, 42Ra, and 43Ra in the rolls 41R, 42R, and 43R is similar to the case of the above-described rotating drum 21, and thus the descriptions thereof are omitted.

Figure 8:
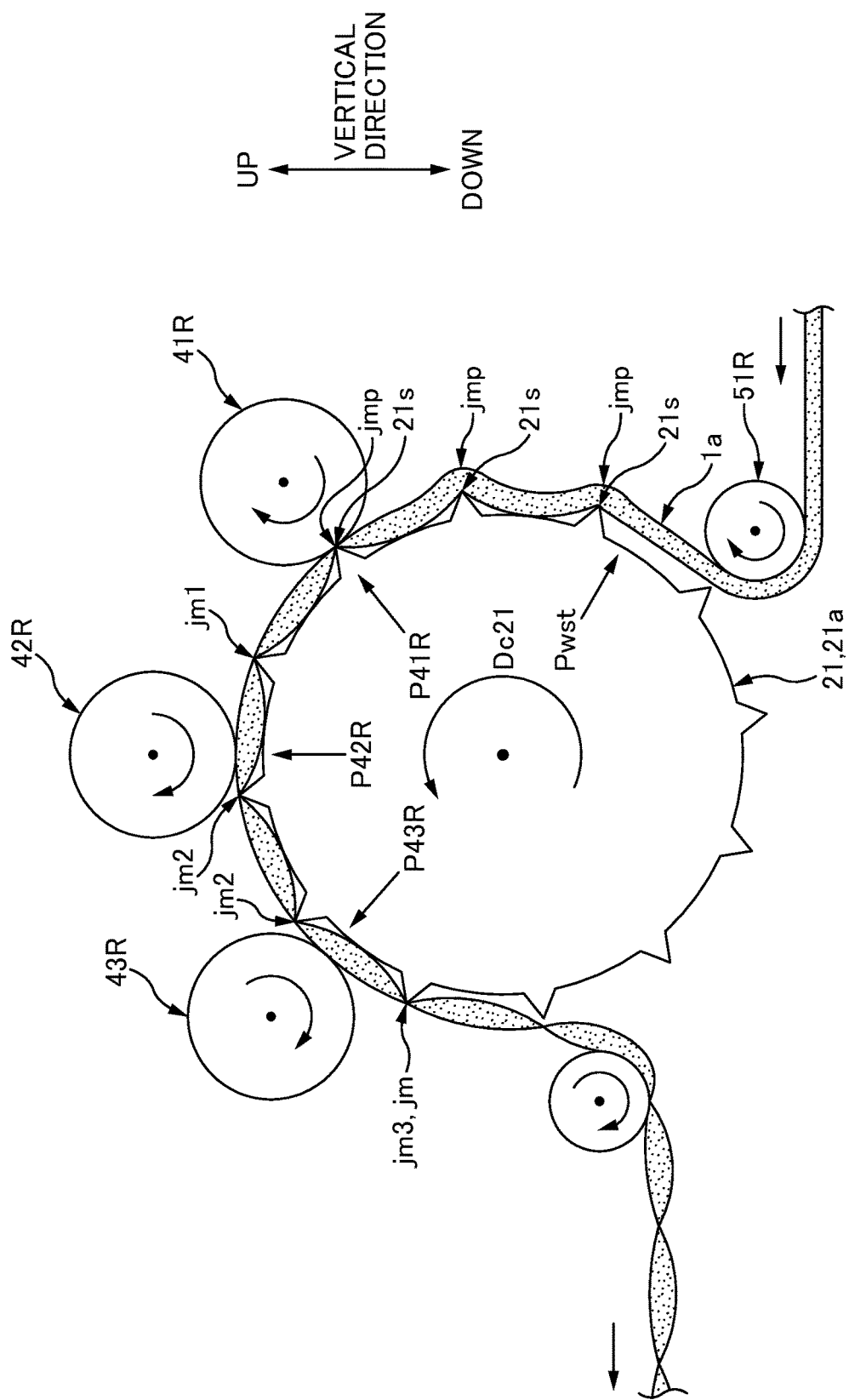
FIG. 8 is a schematic side view of the same.

In this example of FIG. 7, a winding start position Pwst of the half-finished products 1a to wind around the rotating drum 21 is set at the position upstream, in the direction of rotation Dc21, from the position P41R at which the first seal roll 41R is arranged. Thus, as illustrated in FIG. 8, when the first seal roll 41R compresses the formation target part jmp, of the main joining portion jm, in the half-finished products 1a in corporation with the supporting portion 21s, the half-finished product(s) 1a has (have) already been contacted and supported by at least one supporting portion 21s that is positioned upstream, in the direction of rotation Dc21, from the first seal roll 41R.

Accordingly, during the compression by the first seal roll 41R, at least two supporting portions 21s and 21s appropriately restrict the relative movement of the half-finished products 1a. Consequently, the first seal roll 41R can stably perform the formation process of the welding portions jm1 of the first stage at the formation target parts jmp in the half-finished products 1a. Incidentally, in the example of FIG. 8, when the first seal roll 41R compresses the formation target parts jmp, two supporting portions 21s and 21s contact to support the half-finished products 1a at the positions upstream, in the direction of rotation Dc21, from the first seal roll 41R; however, this should not be construed in a limiting sense. That is, the number of the supporting portions 21s may be one or may be three or more.

The half-finished products 1a are wound around the rotating drum 21 from the winding start position Pwst, for example, with an auxiliary roll 51R for winding being disposed at a position near the winding start position Pwst. That is, at this position, the roll 51R which is configured to rotate around a rotation axis along the CD direction is disposed, as the auxiliary roll 51R, near the outer peripheral surface 21a of the rotating drum 21. Such auxiliary roll 51R may be configured as a driven rotation roll that obtains a rotation force through contact with the half-finished product 1a to guide the half-finished product 1a. Alternatively, the auxiliary roll 51R may be configured as a drive rotation roll that obtains a rotation force from an appropriate driving source, such as a servo motor, to rotate.

Incidentally, in an embodiment of the present disclosure, in order to reduce unevenness in fiber distribution in the CD direction of the continuous body 5a of the fiber bundle (hereinafter, simply referred to as the fiber bundle 5a), the pressing roll 61R (corresponding to a pressing member) is disposed at a position between the auxiliary roll 51R and the first seal roll 41R in the direction of rotation Dc21, as illustrated in FIG. 7. That is, this pressing roll 61R is configured to press the half-finished products 1a wound around and held onto the outer peripheral surface 21a of the rotating drum 21 to the inside in the radial direction of rotation, to level the fiber bundle 5a of the half-finished products 1a, thereby reducing unevenness in the fiber distribution thereof in the CD direction. The first to third seal rolls 41R, 42R, and 43R form the main joining portions jm in the half-finished products 1a in a state where the unevenness in fiber distribution has been reduced.

Accordingly, this heat sealing apparatus 10 can reduce the unevenness in the degree of welding of the main joining portion jm across the CD direction. This can effectively restrain falling off of fibers, which may occur in a part having a low degree of welding in the main joining portion jm, and broken weld, which may occur in a part having a higher degree of welding in the main joining portion jm.

The pressing roll 61R having such a function is supported, rotatably around the rotation axis along the CD direction, at both sides by appropriate bearing members 61B and 61B which are respectively disposed at the end portions in the CD direction. Additionally, the roll 61R is, for example, a flat roll having a smooth outer peripheral surface 61Ra. Thus, the fibers in the fiber bundle 5a can be moved in the CD direction, so as to reduce the unevenness in fiber distribution in the CD direction of the fiber bundle 5a, based on the pressing operation of the roll 51R. For example, the pressing force of the pressing roll 61R is likely to be greater in a part having a larger amount of fibers in the CD direction, while the pressing force is likely to be smaller in a part having a smaller amount of fibers. Accordingly, the fibers can be moved in the CD direction in such a manner as to be forced from the part having a larger amount of fibers to the part having a smaller amount of fibers. This can reduce the unevenness in fiber distribution.

Further, in this example, the pressing roll 61R is configured to be reciprocatable in the radial direction of rotation of the rotating drum 21. Thus, the outer peripheral surface 61Ra of the roll 61R can be pushed to the inside of the radial direction of rotation. That is, it is configured such that the aforementioned bearing members 61B and 61B are guided to be reciprocatable in the radial direction of rotation of the rotating drum 21 by a guiding member (not illustrated) such as a linear guide fixed to the housing 15, and that the pressing force in the radial direction of rotation is exerted to the bearing members 61B from an air cylinder 61A (corresponding to a pushing mechanism) serving as one example of the actuator 61A that is fixed to the housing 15. Accordingly, the pressing roll 61R can push the outer peripheral surface 61Ra thereof to the inside in the radial direction of rotation of the rotating drum 21 through the reciprocating movement thereof.

With a configuration in which such pushing is enabled, as in an example of FIG. 7, even in a case where the outer peripheral surface 21a has a shape including a part displaced in the radial direction of rotation corresponding to the position in the direction of rotation Dc21, which is caused by the supporting portions 21s, 21s . . . formed to protrude in the outer peripheral surface 21a of the rotating drum 21, the amount of pushing the outer peripheral surface 61Ra of the pressing roll 61R to the inside in the radial direction of rotation can be changed in association with the rotation operation of the rotating drum 21. This allows the roll 61R to push the half-finished products 1a over substantially all the length of the half-finished products 1a.

For example, when the supporting portion 21s passes through an arrangement position P61R of the pressing roll 61R in the direction of rotation Dc21 of the rotating drum 21, the pressing roll 61R is moved by the supporting portion 21s to the outside in the radial direction of rotation of the rotating drum 21 while resisting the pressing force exerted by the actuator 61A. When a part 21m, which is between the supporting portions 21s and 21s immediately adjacent to each other in the direction of rotation Dc21, passes through the arrangement position P61R, the pressing roll 61R is moved by the pressing force exerted by the actuator 61A to the inside in the radial direction of rotation. Accordingly, the pressing roll 61R can push the half-finished products 1a across substantially all the length thereof, irrespective of the shape of the outer peripheral surface 21a of the rotating drum 21.

Further, as understood from the above, the pressing roll 61R periodically reciprocates in the radial direction of rotation of the rotating drum 21 at the product pitch P1. With the pressing roll 61R configured to reciprocate as such, the vibration of such reciprocation is transmitted to the half-finished products 1a, thereby being able to effectively move the fibers of the fiber bundle 61a in the CD direction. Consequently, the unevenness in fiber distribution of the fiber bundle 5a can be reduced more reliably.

The magnitude of the pressing force (N) exerted by the pressing roll 61R is set to the magnitude at which formation of the welding portion (or the compression-bonding portion) in the half-finished product 1a is avoided. Accordingly, the roll 61R is configured as a roll exclusively dedicated to and specialized in the aforementioned process of reducing the unevenness in fiber distribution. Incidentally, the magnitude of the pressing force (N) at which formation of the welding portion is avoided can be obtained by, for example, an experiment using an actual apparatus. That is, the half-finished products 1a are caused to pass through the heat sealing apparatus 10 in a state where the first to the third seal rolls 41R, 42R, and 43R do not perform compression, while the magnitude of the pressing force (N) is being changed at a plurality of levels. Thereafter, presence/absence of the welding portions formed in the half-finished products 1a is checked. Accordingly, the magnitude of the pressing force (N) can be obtained. The adjustments of the pressing force (N) can be made, for example, as follows. That is, such adjustments can be made by adjusting a pressure value (Pa) of compressed air, serving as a working fluid supplied to the air cylinder 61A, using a pressure regulation mechanism such as a pressure regulation valve.

Further, in this example, as illustrated in FIG. 7, the half-finished products 1a are wound around and held on the outer peripheral surface 21a of the rotating drum 21, from a position upstream in the rotation direction Dc21 with respect to the pressing position P61R, which is the arrangement position P61R of the pressing roll 61R. Thus, the pressing roll 61R can swiftly perform a pressing process for the half-finished products 1a that are held on the outer peripheral surface 21a of the rotating drum 21. Consequently, the pressing process can be stably performed.

Further, in this example of FIG. 7, the half-finished products 1a are wound, at a predetermined winding angle, around not only the rotating drum 21 but also the auxiliary roll 51R. Accordingly, the conveyance path of the half-finished products 1a includes an S-shaped part of the conveyance path on the upstream side in the rotation of direction Dc21 with respect to the position of the first seal roll 41R. Thus, when the half-finished products 1a pass through this S-shaped part of the conveyance path, the fiber bundle 5a of the half-finished products 1a is subjected to bending process twice in which bending directions are opposite to each other. With this bending process as well, the fibers of the fiber bundle 5a are moved in the CD direction. This also effectively contributes to the reduction in the unevenness in fiber distribution in the CD direction of the fiber bundle 5a.

Figure 9:
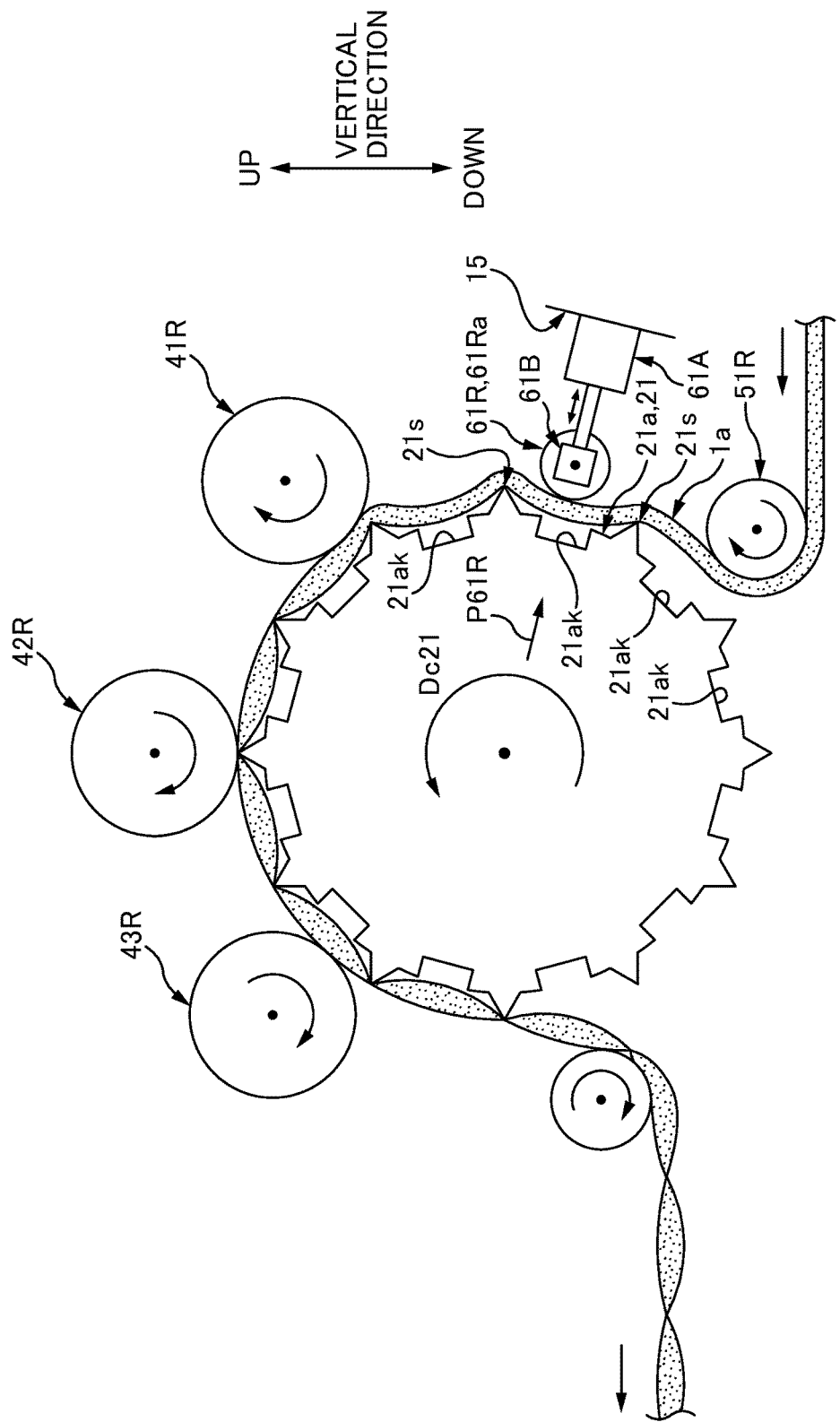
FIG. 9 is a schematic side view of an example in which recessed portions 21ak are provided to an outer peripheral surface 21a of a rotating drum 21.

In some cases, as illustrated in FIG. 9, recessed portions 21ak recessed to the inside in the radial direction of rotation with respect to the outer peripheral surface 21a may be formed at each position between the supporting portions 21s and 21s immediately adjacent to each another in the outer peripheral surface 21a of the rotating drum 21. In this case, such a recessed portion 21ak has such a size that at least a part of the pressing roll 61R gets thereinto. Accordingly, a stroke of the reciprocating movement of the pressing roll 61R can be further increased. Consequently, it becomes possible to further effectively reduce the aforementioned unevenness in fiber distribution.

Incidentally, in this example, a roll whose peripheral part including at least the outer peripheral surface 61Ra is made of rubber or resin is used as such pressing roll 61R; however, this should not be construed in a limiting sense. For example, a metallic roll whose peripheral surface is made of steel may be used. Further, in this case, the pressing roll 61R is configured as a driven rotation roll that obtains the rotation force through contact with the half-finished product 1a to guide the half-finished product 1a; however, this should not be construed in a limiting sense. That is, the pressing roll 61R may be configured as a drive rotation roll that obtains the rotation force from an appropriate driving source, such as a servo motor, to rotate. As the actuator 61A configured to cause the roll 61R to reciprocate, a hydraulic cylinder, a compression spring or the like can be employed in place of the air cylinder.

Figure 10A:
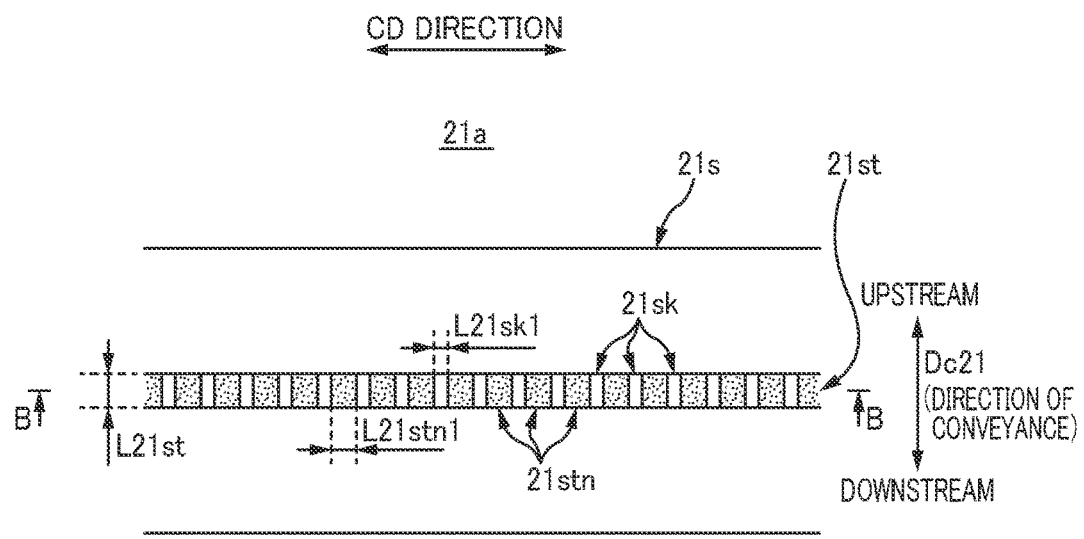
FIG. 10A is an enlarged schematic front view of a top surface 21st of a supporting portion 21s.
Figure 10B:
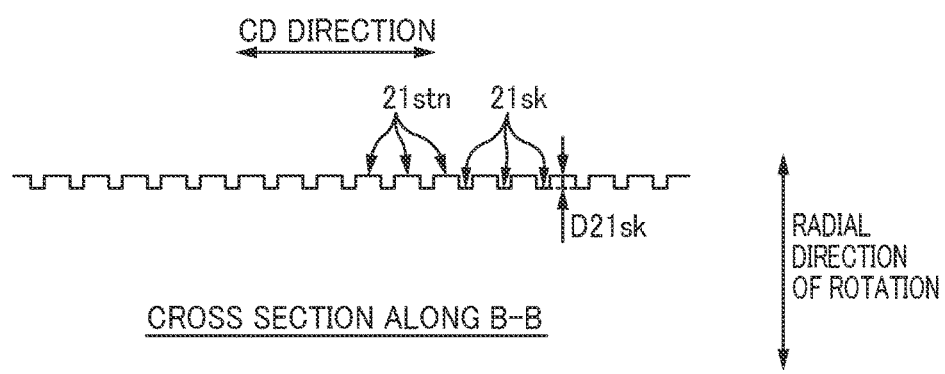
FIG. 10B is a cross-sectional view of a top surface 21st taken along line B-B in FIG. 10A.

Incidentally, the aforementioned function of reducing the unevenness in fiber distribution of the fiber bundle 5a can be performed by virtue of contrivance for the top surface 21st of the supporting portion 21s in the rotating drum 21. FIGS. 10A and 10B are explanatory views of an example thereof. Note that FIG. 10A is a schematic front view illustrating the top surface 21st of the supporting portion 21s, and FIG. 10B is a cross-sectional view of the top surface 21st taken along line B-B in FIG. 10A.

As illustrated in FIGS. 10A and 10B, in these examples, a plurality of recessed portions 21sk, 21sk . . . are formed to be aligned in the CD direction in each of the top surfaces 21st of the supporting portions 21s in the rotating drum 21. The top surfaces each has a dimension L21st in the direction of rotation Dc21 set in a range, for example, from 1.5 mm to 2.0 mm, the recessed portions 21sk each has a dimension L21sk1 in the CD direction set in a range, for example, from 0.5 mm to 1.0 mm, non-recessed portions 21stn each between the recessed portions 21sk and 21sk each has a dimension L21stn1 in the CD direction set in a range, for example, from 0.5 mm to 1.5 mm. Further, the recessed portions has a depth D21sk set in a range, for example, from 0.05 mm to 1.0 mm, preferably, set in a range, for example, from 0.3 mm to 0.7 mm, and in this example, set to 0.5 mm.

If the fiber bundle 5a is compressed with the top surface 21st in which such recessed portions 21sk are formed, the fibers of the non-recessed portions 21stn can be forced toward the recessed portion 21sk, based on the difference in magnitude between the compression force at the recessed portion 21sk and the compression force at the non-recessed portion 21stn. Such pushing out function becomes more remarkable as the amount of the fibers of the non-recessed portions becomes larger. Accordingly, the greater amount of the fibers distributed in the non-recessed portions 21stn in an unbalanced manner can be effectively pushed toward the recessed portions 21sk. This also effectively contributes to the reduction in unevenness of fiber distribution in the CD direction of the aforementioned fiber bundle 5a.

Incidentally, in this example, as illustrated in FIG. 10A, both the recessed portions 21sk and the non-recessed portions 21stn are in a rectangular shape; however, this should not be construed in a limiting sense. That is, they may be formed in other shapes.

Figure 11:
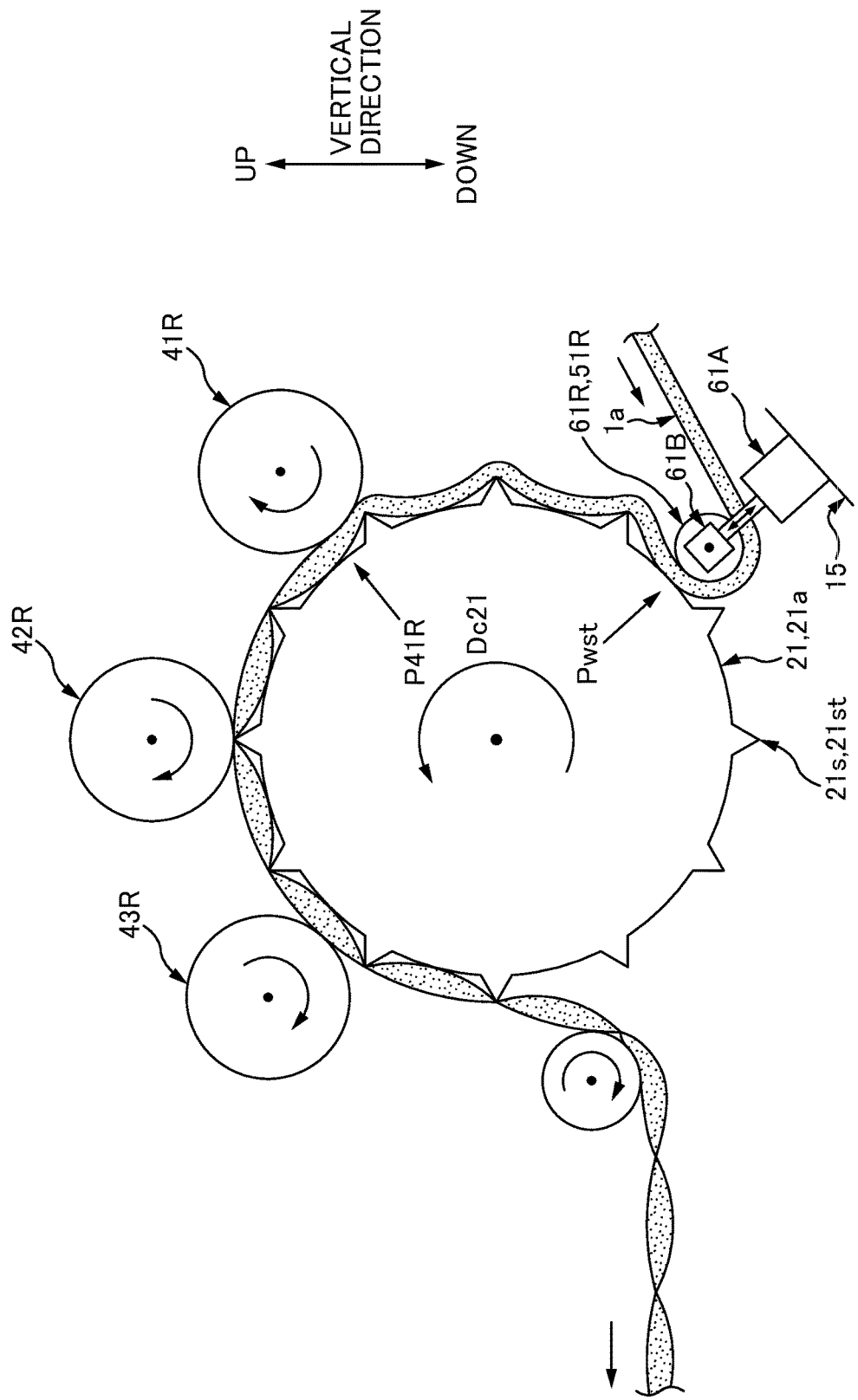
FIG. 11 is a schematic side view of a modified example of a pressing roll 61R.

FIG. 11 is a schematic side view of a modified example of the pressing roll 61R. In an embodiment described above, as illustrated in FIG. 7, the aforementioned auxiliary roll 51R relating to the winding of the half-finished products 1a is included independently of the pressing roll 61R. In this modified example, the pressing roll 61R serves also as the auxiliary roll 51R, that is, the auxiliary roll 51R is omitted. The modified example is different from an embodiment described above mainly in this respect, and is similar in general to an embodiment described above in other respects. Therefore, such a difference will be mainly described below and the configurations similar to those in an embodiment described above are designated as the same reference numerals, with the descriptions thereof being omitted.

As illustrated in FIG. 11, in this modified example, the pressing roll 61R is disposed at a position of the auxiliary roll 51R in an embodiment described above. Thus, the roll 61R can function as the winding roll 51R for winding and holding the half-finished products 1a around the rotating drum 21 from the position upstream in the direction of rotation Dc21 with respect to the position P41R of the first seal roll 41R. Further, the roll 61R is configured to reciprocate in the radial direction of rotation of the rotating drum 21 by the aforementioned actuator 61A. Thus, the primary function, which is to reduce the unevenness in the fiber distribution in the CD direction of the fiber bundle 5a, can be performed without any problem.

Other Embodiments

While the embodiments of the present disclosure are described hereinabove, the embodiments are intended for easy understanding of the present disclosure and are not in any way to be construed as limiting the present disclosure. Needless to say, the present disclosure may be modified and improved without departing from the scope of the disclosure, and equivalents thereof are also encompassed by the disclosure. For example, the following modifications are possible.

In the above-described embodiments, as illustrated in FIG. 7, the rotating drum 21 is given as one example of the rotator, the first seal roll 41R to the third seal roll 43R are given as examples of the compression-bonding member, and further the pressing roll 61R is given as one example of the pressing member, this should not be construed in a limiting sense. For example, an endless belt configured to drive to circle may be used as the rotator, compression-bonding member, and pressing member. Incidentally, the endless belt is run around at least two rollers, and a drive rotation force is given to at least one of the rollers from a driving source such as a servo motor. This rotates the belt in a circumferential direction of the belt.

Although the above-described embodiments include the three seal rolls 41R, 42R and 43R as examples of the compression-bonding member, the number of seal rolls is not limited to this. For example, the seal rolls 41R, 42R and 43R may be one or two or may be four or more.

As illustrated in FIG. 7, in the above-described embodiments, the flat rolls whose outer peripheral surfaces 41Ra, 42Ra, and 43Ra are smooth as examples of the first to the third seal rolls 41R, 42R, and 43R; however, this should not be construed in a limiting sense. For example, protrusions (not illustrated) that protrude from the outer peripheral surfaces 41Ra, 42Ra, and 43Ra may be provided, corresponding to the supporting portions 21s of the rotating drum 21, on the outer peripheral surfaces 41Ra, 42Ra, and 43Ra of the seal rolls 41R, 42R and 43R.

In this case, the protrusion of the first seal roll 41R compresses the formation target part jmp of the main joining portion jm in cooperation with the supporting portion 21s. The protrusion on the second seal roll 42R compresses the welding portion jm1 of the first stage in cooperation with the supporting portion 21s. The protrusion on the third seal roll 43R compresses the welding portion jm2 of the second stage in cooperation with the supporting portion 21s.

In the above-described embodiments, the half-finished products 1a serving as one example of the continuous body of the web member include the continuous sheet 3a of the auxiliary sheets, the continuous sheet 2a of the base material sheets, the four fiber bundles 5a, 5a . . . , and the continuous sheet 7a of the oblong sheets; however, this should not be construed in a limiting sense. That is, it is only necessary that the half-finished products 1a have at least one bundle of the fiber bundle 5a. Accordingly, for example, any one or two of or all of the continuous sheet 3a of the auxiliary sheets, the continuous sheet 2a of the base material sheets, and the continuous sheet 7a of the oblong sheets may be omitted. Further, the fiber bundle 5a is not limited to four bundles.

As illustrated in FIG. 7, in the above-described embodiments, the continuous sheet 3a of the auxiliary sheets, the continuous sheet 2a of the base material sheets, the continuous bodies 5a, 5a . . . of the four fiber bundles, and the continuous sheet 7a of the oblong sheets have already been stacked and sent to the heat sealing apparatus 10; however, this should not be construed in a limiting sense. That is, depending on an apparatus layout, some or all of the continuous sheets 3a, 2a, and 7a and the fiber bundles 5a, 5a . . . may be individually conveyed up to the position of the auxiliary roll 51R of the heat sealing apparatus 10. That is, the stacked state as described above may be configured such that these members are joined to one another at the position of the roll 51R.

In an embodiment described above, as illustrated in FIG. 7, the amount of pushing out, in the radial direction of rotation, of the outer peripheral surface 61Ra of the pressing roll 61R is changed by causing the pressing roll 61R to reciprocate in the radial direction of rotation of the rotating drum 21 using the actuator 61A; however, this should not be construed in a limiting sense.

Figure 12:
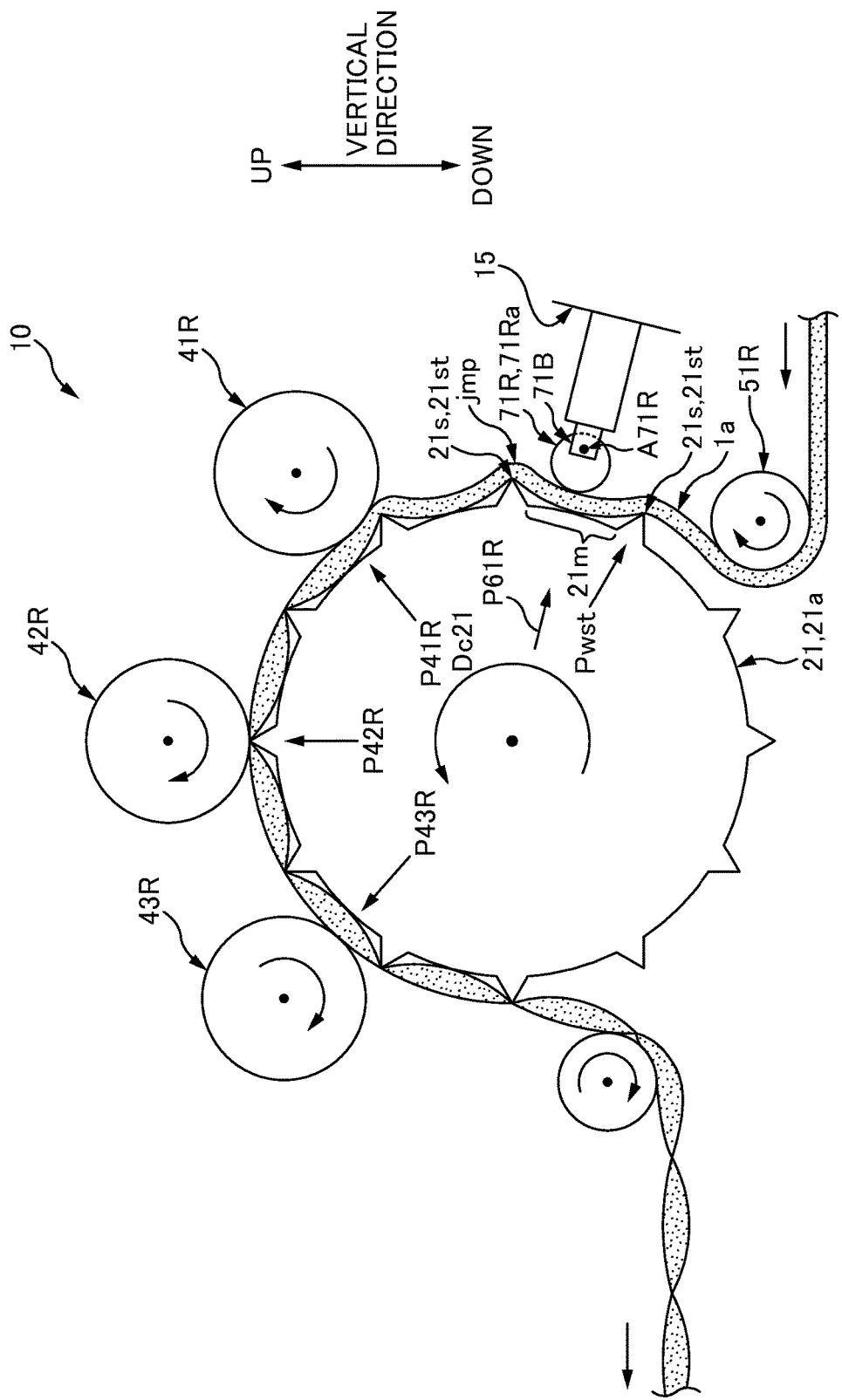
FIG. 12 is a schematic side view of another embodiment of a pressing roll 71R.

For example, as illustrated in FIG. 12, an eccentric rotation roll 71R configured to eccentrically rotate may be used as a pressing roll 71R. That is, while the rolls 71R are respectively provided at ends in the CD direction, the rolls 71R are supported to be rotatable around an eccentric axis A71R, which is eccentric to the center of the roll 71R, at both sides by bearing members 71B and 71B that are immovably fixed at a predetermined position to the housing 15. The rolls 71R includes a driving source (not illustrated), such as a servo motor, configured to drive the pressing roll 71R to rotate around the eccentric axis A71R. In this case, the rolls 71R are controlled so as to rotate with the rotation operation of the rotating drum 21 based on, for example, a synchronous signal or the like. That is, the rotation operations of the rolls 71R are controlled, so that the rolls 71R rotate one revolution every time the supporting portions 21s, 21s . . . on the rotating drum 21 passes through the position of the pressing roll 71R. As a result, the amount of pressing the outer peripheral surface 71Ra of the pressing roll 71R can be reduced when the supporting portion 21s passes therethrough, while the amount of pressing is increased when the portion 21m between the supporting portions 21s and 21s passes therethrough. Accordingly, the pressing roll 71R can press the half-finished products 1a to the inside in the radial direction of rotation of the rotation drum 21 over substantially all the length of the half-finished product 1a.

Furthermore, the configuration of a pressing roll is not limited to such a configuration that the pressing roll 61R is capable of reciprocating as in FIG. 7 and such a configuration that the pressing roll 71R is capable of eccentrically rotating as in FIG. 12, as long as the half-finished products 1a can be pressed to the inside in the radial direction of rotation of the rotating drum 21 over substantially all the length of the half-finished products 1a.

For example, with an outer peripheral portion including the outer peripheral surface 61a of the pressing roll 61R being made of a material that can be elastically deformed, such as a resin sponge-like member, the elastic deformation of the aforementioned outer peripheral portion can swiftly absorb changes in the position in the radial direction of rotation of the outer peripheral surface 21a of the rotating drum 21, which may be caused in association with the rotation operation of the rotating drum 21. Thus, in this case, the pressing roll 61R does not have to reciprocate using the actuator 61A as in the example of FIG. 7, or the pressing roll does not have to eccentrically rotate around the eccentric axis A71R as in the example of FIG. 12. That is, with the use of the pressing roll 61R whose peripheral portion is capable of being elastically deformed in a flexible manner, the half-finished products 1a can be pressed over substantially all the length of the half-finished products 1a without any problem, even if the pressing roll 61R is supported at a fixed position to be rotatable around the center of the roll serving as its rotation axis. Such a configuration is also included in a scope of the present disclosure.

In an embodiment described above, flat rolls whose outer peripheral surfaces 61Ra and 71Ra are smooth are given as examples of the pressing rolls 61R and 71R. That is, the pressing rolls 61R and 71R have roll profiles that are flat at least in such a range that the half-finished products 1a are contacted therewith in the CD direction. However, this should not be construed in a limiting sense. For example, depending on the fiber distribution of the fiber bundle 5a of the half-finished products 1a, the roll profiles of the pressing rolls 61R and 71R may be formed into a chevron shape or an inverted chevron shape.

In an embodiment described above, the pressing roll 61R is configured to be capable of reciprocating to the inside and outside in the radial direction of rotation of the rotating drum 21. However, the directions of such reciprocation may be inclined to some extent with respect to the above-described radial direction of rotation. That is, in the present disclosure, a concept of "pressing to an inside in a radial direction of rotation" includes a case where the direction of pressing is inclined to some extent with respect to the radial direction of rotation, in addition to a case where the direction of pressing is in the same direction as the above-described radial direction of rotation. In other words, as long as a configuration is made such that a component of the pressing force of the pressing roll 61R is directed in the above-described radial direction of rotation, the configuration is included in the scope of the present disclosure.

The invention claimed is:

1. A method of forming compression-bonding portions in a continuous body of a web member at intervals in a direction of conveyance, the method comprising:

conveying the continuous body of the web member in the direction of conveyance, wherein the web member includes a fiber bundle continuously elongated in a fiber direction of the fiber bundle extending along the direction of conveyance, rotating a rotator around a rotation axis along a cross direction intersecting with the direction of conveyance, while holding the continuous body of the web member on an outer peripheral surface of the rotator, to convey the continuous body of the web member in a direction of rotation of the rotator set as the direction of conveyance;

compressing, by a compression-bonding member and the rotator, a formation target part of each of the compression-bonding portions to be formed in the continuous body of the web member, when the formation target part passes through a position of the compression-bonding member disposed at a predetermined position in the direction of rotation, to form the compression-bonding portions; and pressing, by a pressing member, the continuous body of the web member to an inside in a radial direction of the rotator, while avoiding forming the compression-bonding portions in the continuous body of the web member, the pressing member being disposed to be opposed to the outer peripheral surface of the rotator, at a position upstream in the direction of rotation with respect to the compression-bonding member, wherein the continuous body of the web member is in contact with an auxiliary roll such that the continuous body of the web member is held on the outer peripheral surface of the rotator, from a position upstream, in the direction of rotation, with respect to a pressing position of the pressing member, the auxiliary roll rotating around a rotational axis along the cross direction, the pressing member presses the continuous body of the web member held on the outer peripheral surface of the rotator to the inside in the radial direction of the rotator, a plurality of supporting portions is provided to the outer peripheral surface of the rotator at angular intervals in the direction of rotation, the angular intervals corresponding to a product pitch of the web member, the supporting portions protruding from the outer peripheral surface of the rotator and supporting formation target parts, including the formation target part of each of the compression-bonding portions, in the continuous body of the web member, when each of the supporting portions passes through the position of the compression-bonding member in the direction of rotation, said each of the supporting portions compresses one of the formation target parts in cooperation with the compression-bonding member, when each of the supporting portions passes through the position of the pressing member, said each of the supporting portions presses the pressing member to an outside in the radial direction of the rotator, such that the pressing member is moved to the outside in the radial direction of the rotator, and when a part between the supporting portions in the direction of rotation passes through the position of the pressing member, the pressing member is moved to the inside in the radial direction of the rotator based on a pressing force to the inside in the radial direction of the rotator exerted by the pressing member.

2. The method according to claim 1, wherein the pressing member includes a pressing roll configured to rotate around a rotation axis along the cross direction while contacting the continuous body of the web member, an outer peripheral surface of the pressing roll is pressed, by a pressing mechanism, to the inside in the radial direction of the rotator, the outer peripheral surface of the rotator has the part between the supporting portions in the direction of rotation, and the pressing roll is pressed, by the pressing mechanism, toward the outer peripheral surface of the rotator while being movable toward and away from the outer peripheral surface of the rotator in accordance with rotation of the rotator.

3. The method according to claim 1, wherein each of the supporting portions supports the continuous body of the web member at a top surface of said each of the supporting portions, and a plurality of recessed portions are formed, in the cross direction, in the top surface of said each of the supporting portions.

\* \* \* \* \*